(12) United States Patent
Kogota et al.

(10) Patent No.: US 6,711,559 B1
(45) Date of Patent: Mar. 23, 2004

(54) DISTRIBUTED PROCESSING SYSTEM, APPARATUS FOR OPERATING SHARED FILE SYSTEM AND COMPUTER READABLE MEDIUM

(75) Inventors: Hiroshi Kogota, Kawasaki (JP); Mamoru Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 219 days.

(21) Appl. No.: 09/676,854

(22) Filed: Sep. 29, 2000

(30) Foreign Application Priority Data

Dec. 27, 1999 (JP) .......................... 11-370368

(51) Int. Cl.[7] .................. G06F 17/30; G06F 17/00; G06F 12/00
(52) U.S. Cl. ................. 707/1; 707/8; 707/205; 711/150
(58) Field of Search ............... 707/1–2, 8, 100–102, 707/200, 203, 205, 500, 50.1, 513; 711/100, 111, 129–130, 147–148, 150, 153; 715/500.1–501.1

(56) References Cited

U.S. PATENT DOCUMENTS

| | | | | |
|---|---|---|---|---|
| 6,023,706 A | * | 2/2000 | Schmuck et al. | 707/200 |
| 6,260,040 B1 | * | 7/2001 | Kauffman et al. | 345/751 |
| 6,453,354 B1 | * | 9/2002 | Jiang et al. | 709/229 |

FOREIGN PATENT DOCUMENTS

JP          06110809          4/1994

* cited by examiner

Primary Examiner—Alford Kindred
(74) Attorney, Agent, or Firm—Greer, Burns & Crain, Ltd.

(57) ABSTRACT

A distributed processing system is capable of executing an operation for a shared file system, based on inputting a command to one node. A file operation client of the node to which the command for operating the shared file system is inputted, indicates a file operation server of each of all the nodes configuring the distributed processing system to update a shared file system management file possessed by each node in accordance with the command, and indicates the file operation server of its own node to update a node information table and a device information table in each of disks configuring the shared file system.

19 Claims, 30 Drawing Sheets

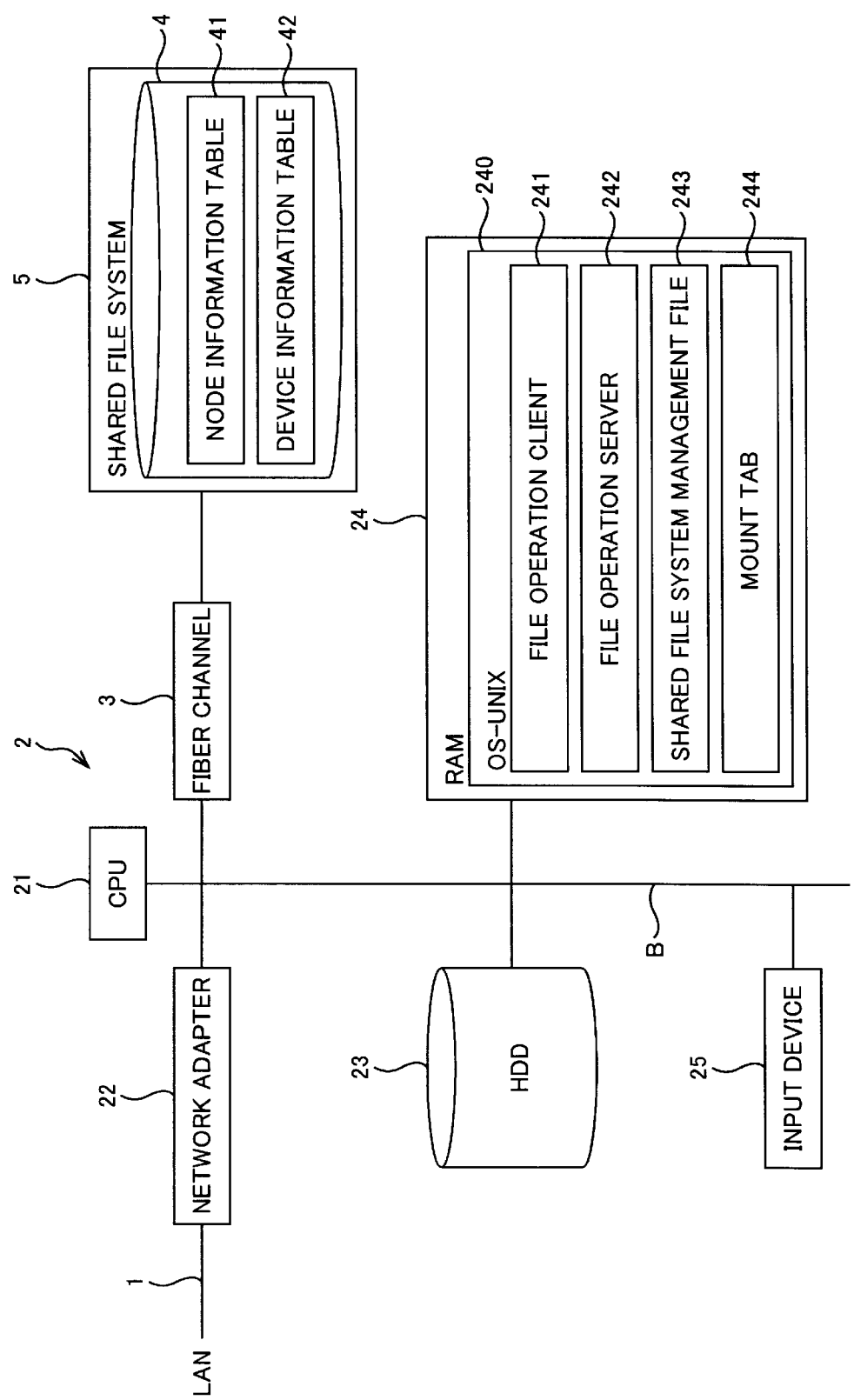

FIG.3

```
#FSID:node,node,···:device,device,···
1:NODE A,NODE B,NODE C:DISK1,DISK2,DISK3
```
~243

FIG.4

NODE INFORMATION TABLE
1 NODE A
2 NODE B
3 NODE C
~41

FIG.5

DEVICE INFORMATION TABLE

ENTRY FOR DISK1
1 DEVICE IDENTIFICATION NUMBER OF DISK1 IN NODE A
2 DEVICE IDENTIFICATION NUMBER OF DISK1 IN NODE B
3 DEVICE IDENTIFICATION NUMBER OF DISK1 IN NODE C

ENTRY FOR DISK2
1 DEVICE IDENTIFICATION NUMBER OF DISK2 IN NODE A
2 DEVICE IDENTIFICATION NUMBER OF DISK2 IN NODE B
3 DEVICE IDENTIFICATION NUMBER OF DISK2 IN NODE C

ENTRY FOR DISK3
1 DEVICE IDENTIFICATION NUMBER OF DISK3 IN NODE A
2 DEVICE IDENTIFICATION NUMBER OF DISK3 IN NODE B
3 DEVICE IDENTIFICATION NUMBER OF DISK3 IN NODE C

~42

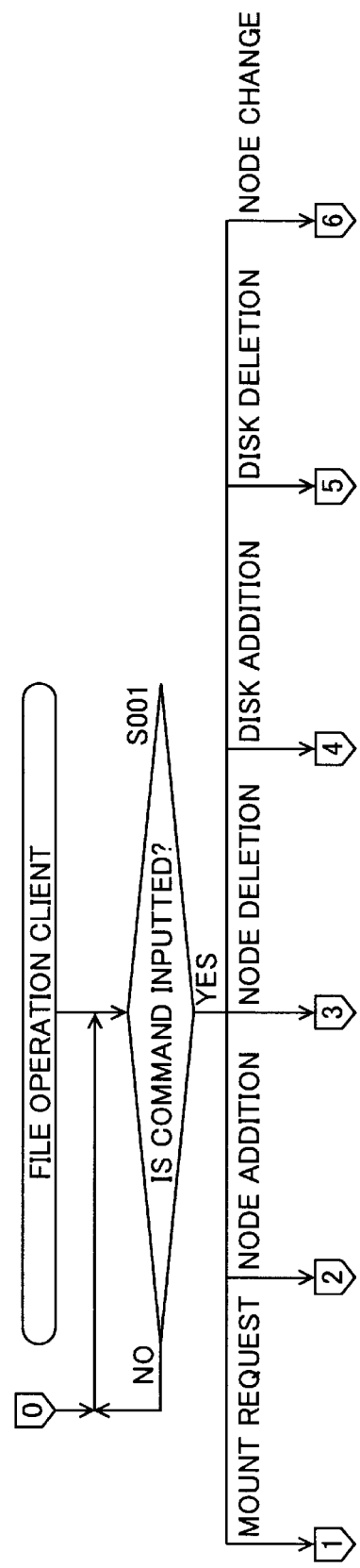

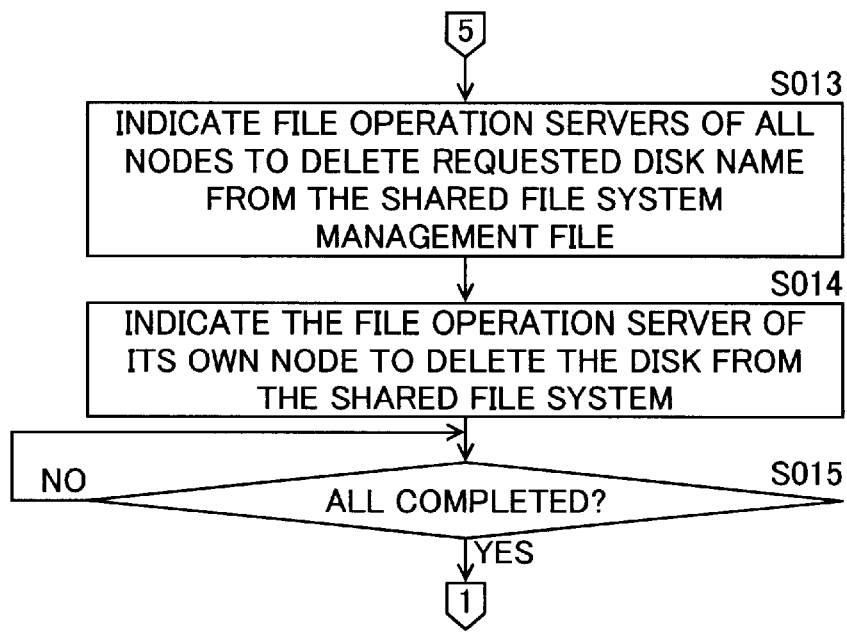
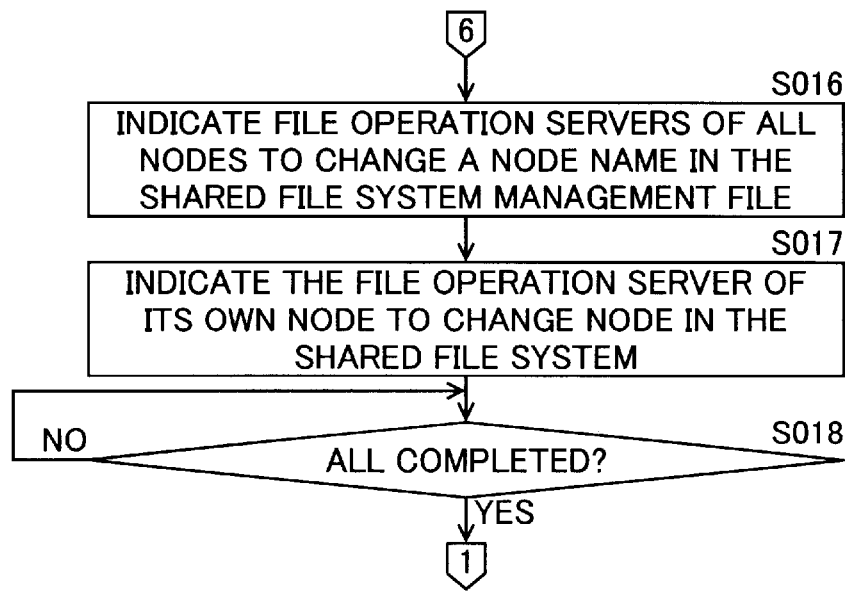

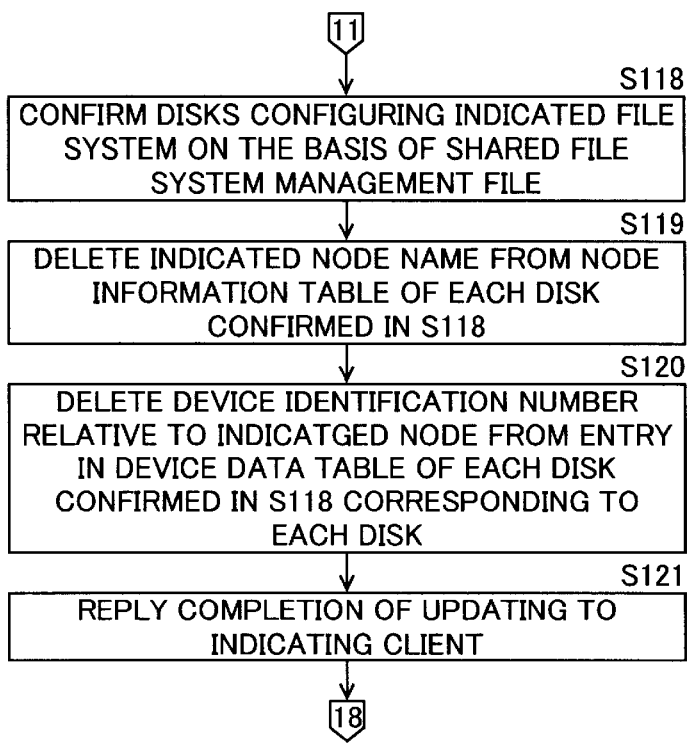
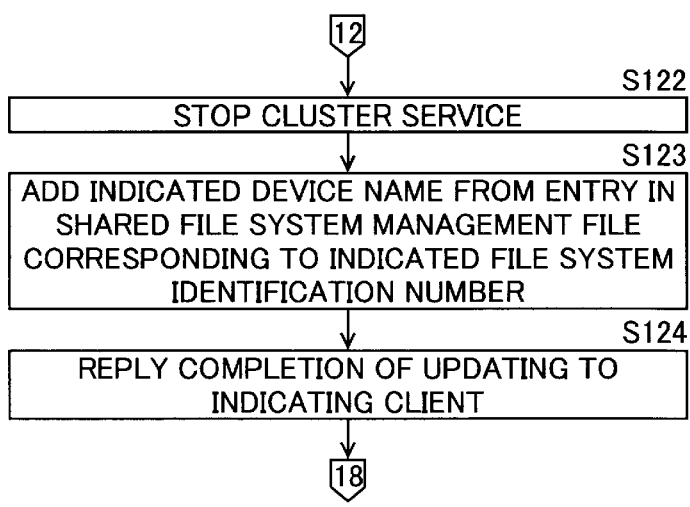

FIG.27

```
#FSID:node,node,···:device,device,···
1:NODE A,NODE B,NODE C:DISK1,DISK2,DISK3
```
~243

↓ ↓ ↓ ADD NODE D

```
#FSID:node,node,···:device,device,···
1:NODE A,NODE B,NODE C,NODE D:DISK1,DISK2,DISK3
```
~243

FIG.30

FSID : node,node,··· : device,device,···
1 : NODE A,NODE B,NODE C : DISK1,DISK2,DISK3    ~243

↓ ↓ ↓  DELETE NODE C

FSID : node,node,··· : device,device,···
1 : NODE A,NODE B : DISK1,DISK2,DISK3    ~243

FIG.34

```
NODE INFORMATION TABLE
      1 NODE A
      2 NODE B                    ~41
      3 NODE C
```

```
DEVICE INFORMATION TABLE
  ENTRY FOR DISK1
  1 DEVICE IDENTIFICATION NUMBER OF DISK1 IN NODE A
  2 DEVICE IDENTIFICATION NUMBER OF DISK1 IN NODE B
  3 DEVICE IDENTIFICATION NUMBER OF DISK1 IN NODE C

ENTRY FOR DISK2
  1 DEVICE IDENTIFICATION NUMBER OF DISK2 IN NODE A     ~42
  2 DEVICE IDENTIFICATION NUMBER OF DISK2 IN NODE B
  3 DEVICE IDENTIFICATION NUMBER OF DISK2 IN NODE C

ENTRY FOR DISK3
  1 DEVICE IDENTIFICATION NUMBER OF DISK3 IN NODE A
  2 DEVICE IDENTIFICATION NUMBER OF DISK3 IN NODE B
  3 DEVICE IDENTIFICATION NUMBER OF DISK3 IN NODE C
```

↓ ↓ ↓ ADD DSIK4

```
NODE INFORMATION TABLE
      1 NODE A
      2 NODE B                    ~41
      3 NODE C
```

```
DEVICE INFORMATION TABLE
  ENTRY FOR DISK1
  1 DEVICE IDENTIFICATION NUMBER OF DISK1 IN NODE A
  2 DEVICE IDENTIFICATION NUMBER OF DISK1 IN NODE B
  3 DEVICE IDENTIFICATION NUMBER OF DISK1 IN NODE C

ENTRY FOR DISK2
  1 DEVICE IDENTIFICATION NUMBER OF DISK2 IN NODE A
  2 DEVICE IDENTIFICATION NUMBER OF DISK2 IN NODE B
  3 DEVICE IDENTIFICATION NUMBER OF DISK2 IN NODE C
                                                        ~42
  ENTRY FOR DISK3
  1 DEVICE IDENTIFICATION NUMBER OF DISK3 IN NODE A
  2 DEVICE IDENTIFICATION NUMBER OF DISK3 IN NODE B
  3 DEVICE IDENTIFICATION NUMBER OF DISK3 IN NODE C

ENTRY FOR DISK4
  1 DEVICE IDENTIFICATION NUMBER OF DISK4 IN NODE A
  2 DEVICE IDENTIFICATION NUMBER OF DISK4 IN NODE B
  3 DEVICE IDENTIFICATION NUMBER OF DISK4 IN NODE C
```

FIG.39

```
#FSID:node,node,···:device,device,···
1:NODE A,NODE B,NODE C:DISK1,DISK2,DISK3
```
⎯243

↓ ↓ ↓ CHANGE SHARED DISK

```
#FSID:node,node,···:device,device,···
1:NODE E,NODE F,NODE G:DISK1,DISK2,DISK3
```
⎯243

FIG.40

NODE INFORMATION TABLE
1 NODE A
2 NODE B
3 NODE C
~41

DEVICE INFORMATION TABLE

ENTRY FOR DISK1
1 DEVICE IDENTIFICATION NUMBER OF DISK1 IN NODE A
2 DEVICE IDENTIFICATION NUMBER OF DISK1 IN NODE B
3 DEVICE IDENTIFICATION NUMBER OF DISK1 IN NODE C

ENTRY FOR DISK2
1 DEVICE IDENTIFICATION NUMBER OF DISK2 IN NODE A
2 DEVICE IDENTIFICATION NUMBER OF DISK2 IN NODE B
3 DEVICE IDENTIFICATION NUMBER OF DISK2 IN NODE C

ENTRY FOR DISK3
1 DEVICE IDENTIFICATION NUMBER OF DISK3 IN NODE A
2 DEVICE IDENTIFICATION NUMBER OF DISK3 IN NODE B
3 DEVICE IDENTIFICATION NUMBER OF DISK3 IN NODE C

~42

↓ ↓ ↓ CHANGE SHARED DISK

NODE INFORMATION TABLE
1 NODE E
2 NODE F
3 NODE G
~41

DEVICE INFORMATION TABLE

ENTRY FOR DISK1
1 DEVICE IDENTIFICATION NUMBER OF DISK1 IN NODE E
2 DEVICE IDENTIFICATION NUMBER OF DISK1 IN NODE F
3 DEVICE IDENTIFICATION NUMBER OF DISK1 IN NODE G

ENTRY FOR DISK2
1 DEVICE IDENTIFICATION NUMBER OF DISK2 IN NODE E
2 DEVICE IDENTIFICATION NUMBER OF DISK2 IN NODE F
3 DEVICE IDENTIFICATION NUMBER OF DISK2 IN NODE G

ENTRY FOR DISK3
1 DEVICE IDENTIFICATION NUMBER OF DISK3 IN NODE E
2 DEVICE IDENTIFICATION NUMBER OF DISK3 IN NODE F
3 DEVICE IDENTIFICATION NUMBER OF DISK3 IN NODE G

~42

DISTRIBUTED PROCESSING SYSTEM, APPARATUS FOR OPERATING SHARED FILE SYSTEM AND COMPUTER READABLE MEDIUM

BACKGROUND OF THE INVENTION

1. Field of the Invention

The present invention relates to a distributed processing system constructed so that a shared file system can be directly accessed by each of a plurality of computers (nodes) in a network environment.

2. Related Background Art

A distributed processing system for distributing processes to a plurality of nodes is provided for a UNIX system. This type of distributed processing system must keep a consistency (matching characteristic) of the data to be processes by the respective nodes as the whole distributed processing system, and hence it is undesirable that two or more pieces of the same data exist within the distributed processing system. Accordingly, a device for storing the data existing in a unique location within the distributed processing system is required to be accessible from each of the nodes. For this purpose, there is a shared file system for sharing one single disk or a plurality of disks (which will hereinafter be referred to as a "shared disk") physically or logically partitioned with the respective nodes within the distributed processing system.

In this type of shared file system, it is required for each node to register identification information of all shared disks configuring the shared file system and identification information of all nodes sharing the shared file system in a shared file system management file in itself, to register, into each shared disk, its own identification information and the device identification information which the node itself uses to access the shared disk, and thereafter to mount the shared file system, by activating cluster service. Further, if the number of the nodes utilizing the shared file system increases or decreases, if such a node changes, or if the number of the shared disks configuring the shared file system increases or decreases, each of the nodes must set each/shared disk in an unmount state by temporarily stopping the cluster service, and thereafter update the shared file system management file and the identification information registered in each of the shared disks.

The operation for the shared file system described above, however, must be executed in each node. While on the other hand, a content of this operation must be consistent throughout the distributed processing system as a whole. Namely, with respect to same shared file system, the contents registered in the shared file system management file of a certain node must be same as that of other node. Therefore a system manager of the distributed processing system must have executed respectively the operation of the same content with respect to the shared file system in each of the nodes. Thus, the shared file system used in the conventional distributed processing system had no contrivance for facilitating the operation for the shared file system.

SUMMARY OF THE INVENTION

It is a primary object of the present invention, which was devised under such circumstances to obviate the above problems, to provide a distributed processing system capable of executing an operation for a shared file system used in the distributed processing system on the basis of a command inputted to one node, an apparatus for operating a shared file system that is included in the node in this distributed processing system, and a computer readable medium stored with a program for making a computer function as the shared file system operating apparatus.

To accomplish the above object, according to a first aspect of the present invention, a distributed processing system is constructed of a plurality of nodes and at least one storage device connected to each other under a network environment. The individual node includes a storage unit for retaining a management file defining identification information of storage devices configuring a shared file system, and identification information of the nodes sharing the shared file system, and a control module for updating the definitions in the management file. The control module of at least one of the nodes indicates the control module of each of the nodes to update the definition in the management file retained in each of the storage units in accordance with a command inputted by an operator.

According to a second aspect of the present invention, a distributed processing system is constructed of a plurality of nodes and at least one storage device connected to each other under a network environment. The individual node includes a first storage unit for retaining a management file defining identification information of a storage device configuring a shared file system and identification information of the nodes sharing the shared file system, a second storage unit for retaining mount information for indicating whether or not the shared file system corresponding to the identification information of a storage device defined by the management file is mounted to its own node, and a control module for updating the definitions of the mount information. The control module of at least one of the nodes indicates the control module of each of the nodes to update the mount information retained in each of the second storage units in accordance with a command inputted by an operator.

In thus constructed distributed processing system according to the present invention, when the operator inputs the command to the node having the function of indicating the updating, the control module of this node indicates the control module of each of the nodes to execute an operation of the shared file system. To be specific, the control module gives the indication of updating the management file defining the shared file system, or the mount information indicating whether or not the shared file system defined by this management file is mounted to its own node. When receiving this indication, the control module of each node executes the operation for the shared file system in accordance with the indication. Accordingly, the operation for the shared file system is completed as the whole distributed processing system simply by the operator's inputting the command a single node.

According to the present invention, only a specified node in the distributed processing system may have the control module for indicating each node to execute the operation (updating the management file or the mount information) for the shared file system, or all the nodes in the distributed processing system may have this control modules. Further, it is desirable that the control module for indicating each node to execute the operation (updating the management file or the mount information) for the shared file system, gives the indication to itself, in other words, that the control module executes the operation of updating the management file within its storage unit, or of updating the mount information within its second storage unit.

Note that only one storage device or a plurality of storage devices may be provided in the distributed processing system. In the case that there are plurality of devices, a part (one or a plurality) of the storage devices among those storage devices may configure the shared file system, or all the storage devices may configure the shared file system. If the plurality of storage devices configure the shared file system, the identification information of the plurality of storage devices are respectively defined in the management file. It is to be noted that each of the storage devices may be one piece of disk or may be a partition defined by logically partitioning a storage area on one single disk, irrespective of whether it or they may configure the shared file system or not. Further, a storage device configuring the shared file system and another storage device that does not configure it may be physically constructed on a single of disk or may be constructed in a disk device having the plurality of disks.

Each of the storage devices configuring the shared file system is stored with a device identification number used when each of the nodes sharing the shared file system accesses the same storage device. The control module for indicating each node to execute the operation (updating the management file or the mount information) of the shred file system, may update the device identification number stored in the storage device by itself, or may indicate the control module of other node to update the device identification number stored in each storage device.

According to a third aspect of the present invention, an apparatus for operating a shared file system in a node configuring a distributed processing system together with other nodes and at least one storage device comprises a storage unit retaining a management file for defining identification information of a storage device configuring a shared file system, and identification information of the nodes sharing the shared file system, and a control module for indicating other nodes configuring the distributed processing system and having the storage unit, to update the management file stored in respective storage unit of each node in accordance with a command inputted by an operator.

According to a fourth aspect of the present invention, an apparatus for operating that shared file system comprises a first storage unit for retaining a management file defining identification information of a storage device configuring a. shared file system, and identification data of the nodes sharing the shared file system, a second storage unit for retaining mount information indicating whether or not the shared file system corresponding to the identification information of storage devices defined by the management file is mounted to its own node, and a control module for indicating other nodes configuring the distributed processing system and having the first and second storage units, to update the mount information retained in each of the second units in accordance with a command inputted by an operator.

According to a fifth aspect of the present invention, there is provided a computer readable medium stored with a program for making a computer configuring a distributed processing system together with other computers and at least one storage device under a network environment execute a step of retaining a management file defining identification information of a storage device configuring a shared file system and identification information of the computers sharing the shared file system, and a step of indicating each of other computers configuring the distributed processing system to update the management file retained by each of the computers in accordance with a command inputted by an operator.

According to a sixth aspect of the present invention, there is provided a computer readable medium stored with a program for making a computer configuring a distributed processing system together with other computers and at least one storage device under a network environment execute a step of retaining a management file defining identification information of a storage device configuring a shared file system and identification information of said computers sharing the shared file system, a step of retaining mount information for indicating whether or not the shared file system corresponding to the identification information of a storage device defined by the management file is mounted to its own computer, and a step of indicating each of other computers configuring the distributed processing system to update the mount information retained by each of the computers in accordance with a command inputted by an operator.

BRIEF DESCRIPTION OF THE DRAWINGS

These objects and advantages of this invention will become more apparent and more readily appreciated from the following detailed description of the presently preferred exemplary embodiments, taken in conjunction with the accompanying drawings of which:

FIG. 2 is a block diagram showing an internal configuration of a node and of a shared disk;

FIG. 3 is a diagram showing a structure of a shared file system management table;

FIG. 4 is a diagram showing a structure of a node information table;

FIG. 5 is a diagram showing a structure of a device information table;

FIG. 6 is a flowchart showing a content of processing by a file operation client;

FIG. 11 is a flowchart showing a content of the processing by the file operation client;

FIG. 12 is a flowchart showing a content of the processing by the file operation client;

FIG. 18 is a flowchart showing a content of the processing by the file operation server;

FIG. 19 is a flowchart showing a content of the processing by the file operation server;

FIG. 27 is an explanatory diagram showing update of a shared file system management table when a node added;

FIG. 30 is an explanatory diagram showing updated of the shared file system management table when the node deleted;

FIG. 34 is an explanatory diagram showing update of the node information table and the device information table when the disk added;

FIG. 39 is an explanatory diagram showing update of the shared file system management table when the node changed; and FIG. 40 is an explanatory diagram showing update of the node information table and the device information table when the node changed.

DESCRIPTION OF THE PREFERRED EMBODIMENT

An embodiment of the present invention will hereinafter be described with reference to the accompanying drawings.

Outline of Architecture of Distributed Processing System

Figure 1:
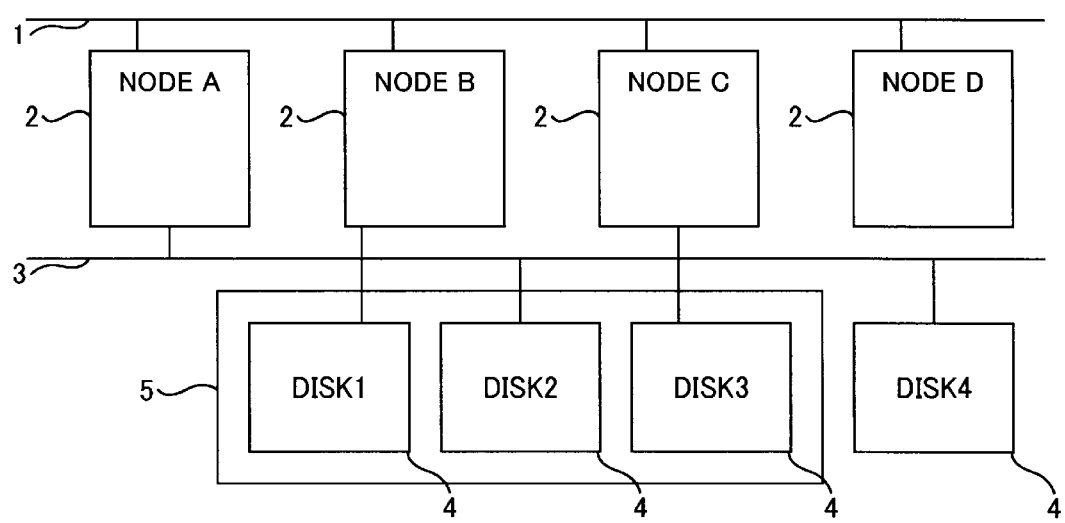
FIG. 1 is a block diagram showing an architecture of a whole distributed processing system in an embodiment of the present invention.
Figure 7:
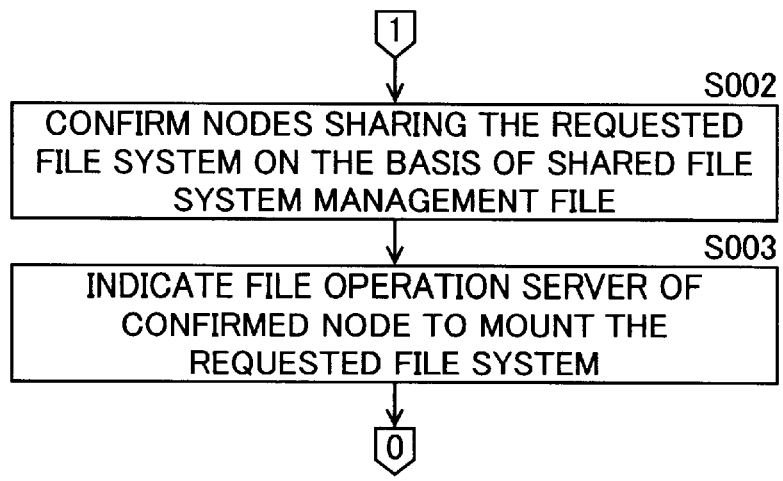
FIG. 7 is a flowchart showing a content of the processing by the file operation client.
Figure 8:
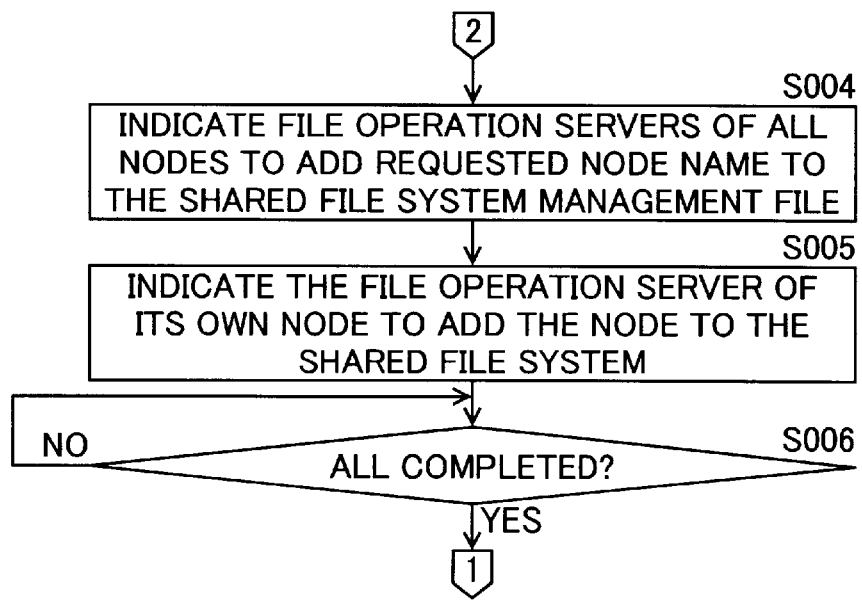
FIG. 8 is a flowchart showing a content of the processing by the file operation client.
Figure 9:
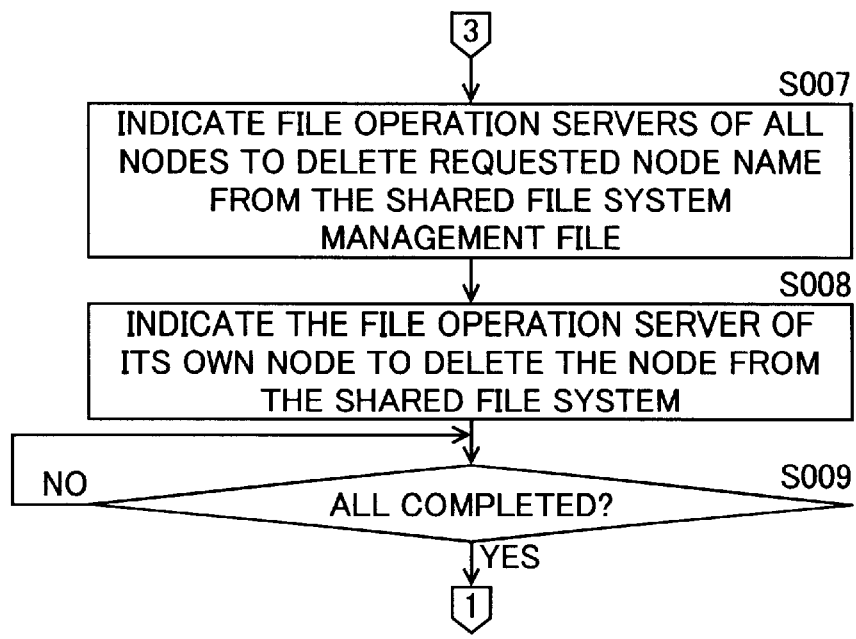
FIG. 9 is a flowchart showing a content of the processing by the file operation client.
Figure 10:
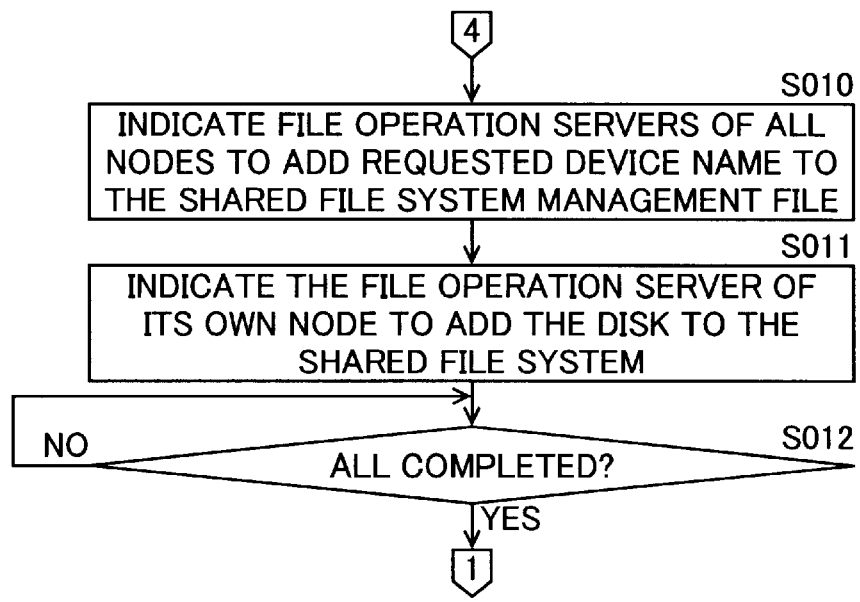
FIG. 10 is a flowchart showing a content of the processing by the file operation client.
Figure 13:
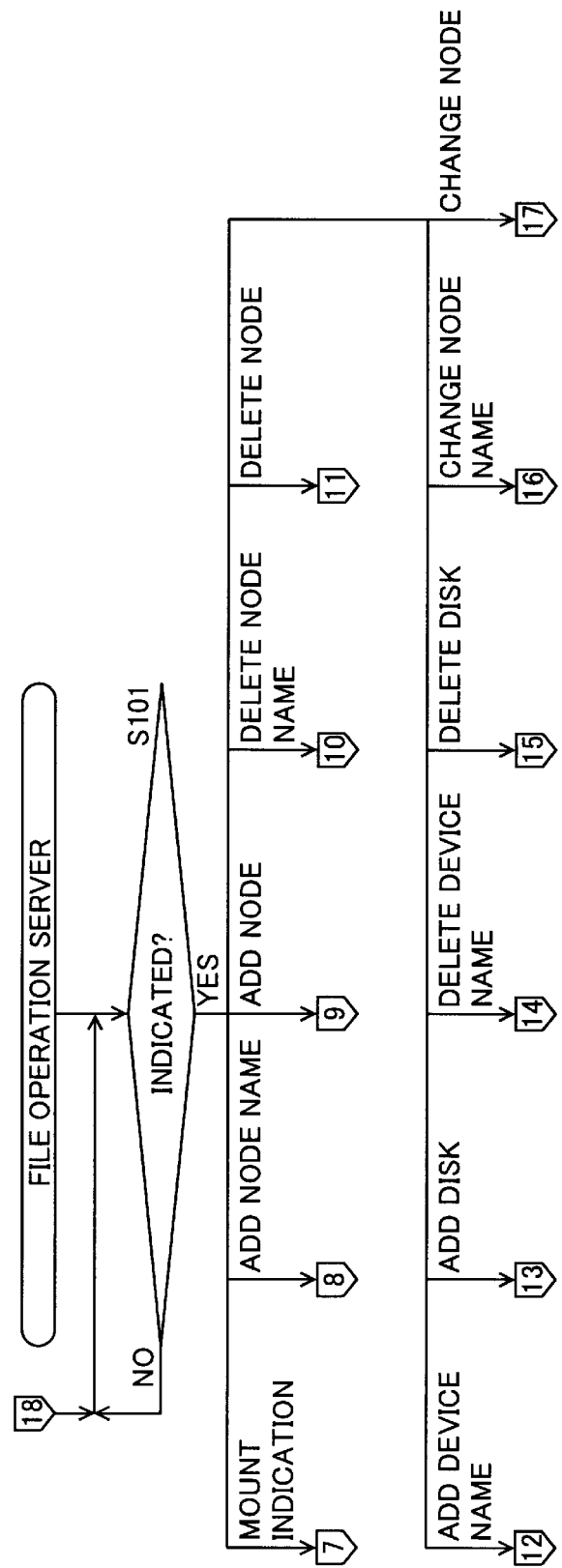
FIG. 13 is a flowchart showing a content of the processing by the file operation server.
Figure 14:
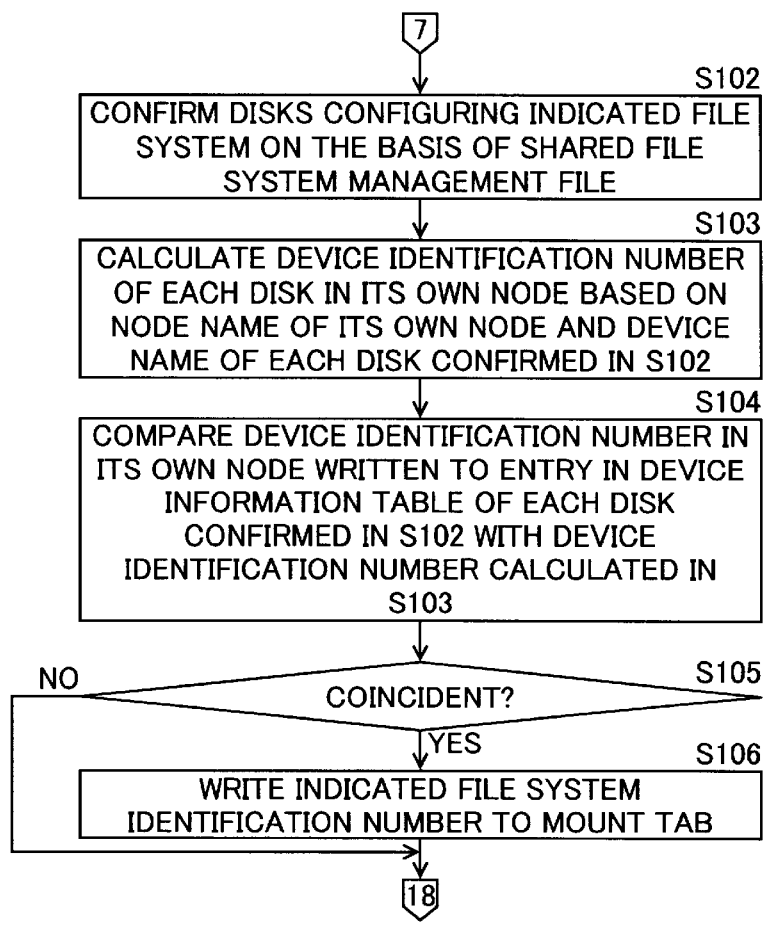
FIG. 14 is a flowchart showing a content of processing by a file operation server.
Figure 15:
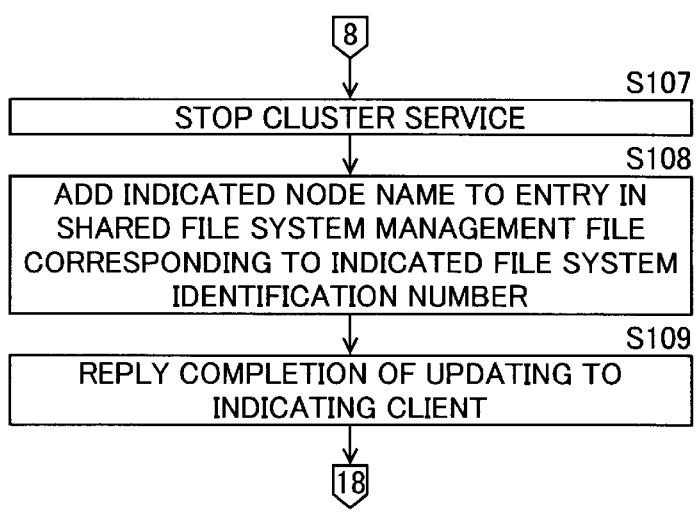
FIG. 15 is a flowchart showing a content of the processing by the file operation server.
Figure 16:
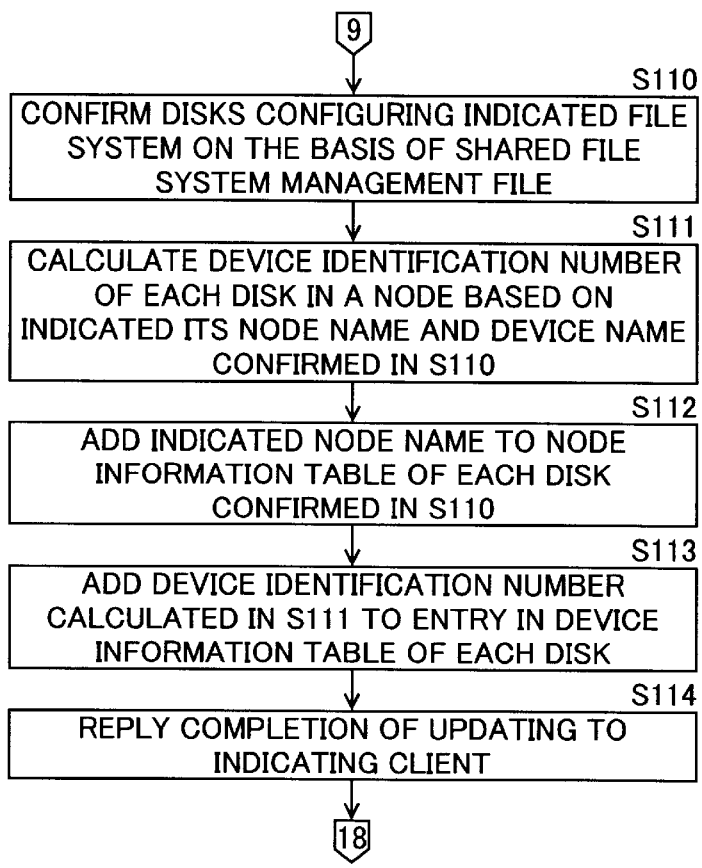
FIG. 16 is a flowchart showing a content of the processing by the file operation server.
Figure 17:
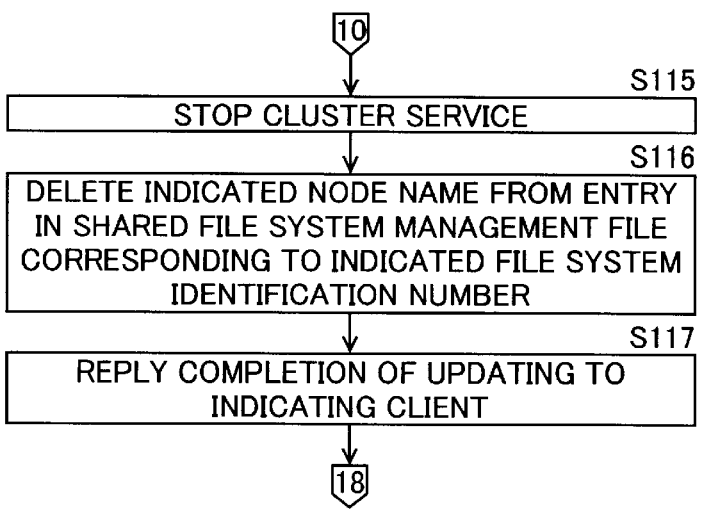
FIG. 17 is a flowchart showing a content of the processing by the file operation server.
Figure 20:
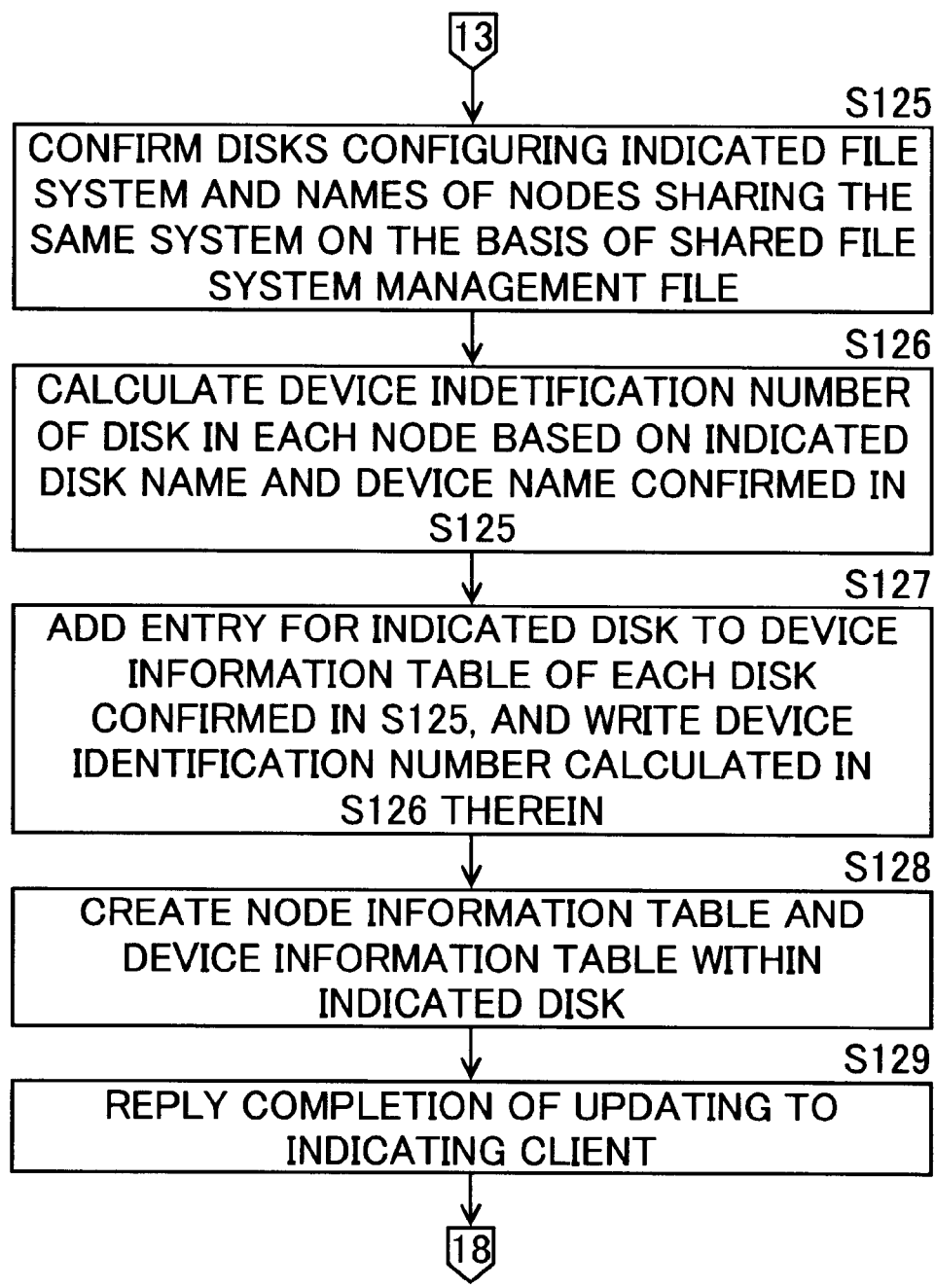
FIG. 20 is a flowchart showing a content of the processing by the file operation server.
Figure 21:
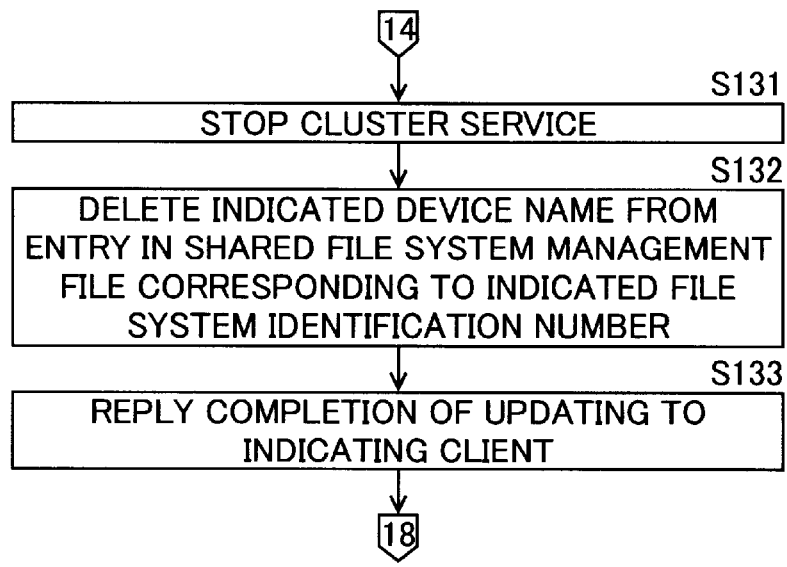
FIG. 21 is a flowchart showing a content of the processing by the file operation server.
Figure 22:
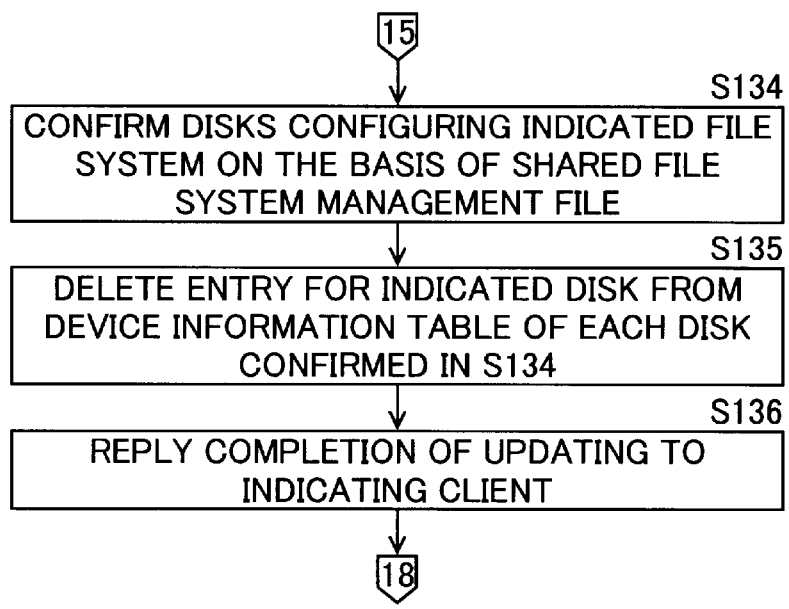
FIG. 22 is a flowchart showing a content of the processing by the file operation server.
Figure 23:
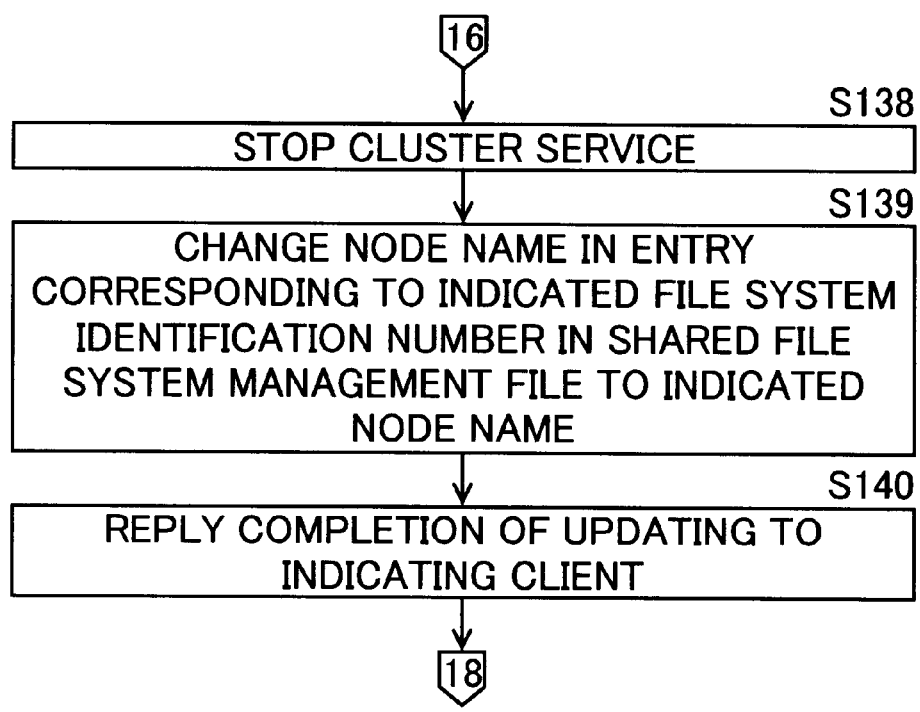
FIG. 23 is a flowchart showing a content of the processing by the file operation server.
Figure 24:
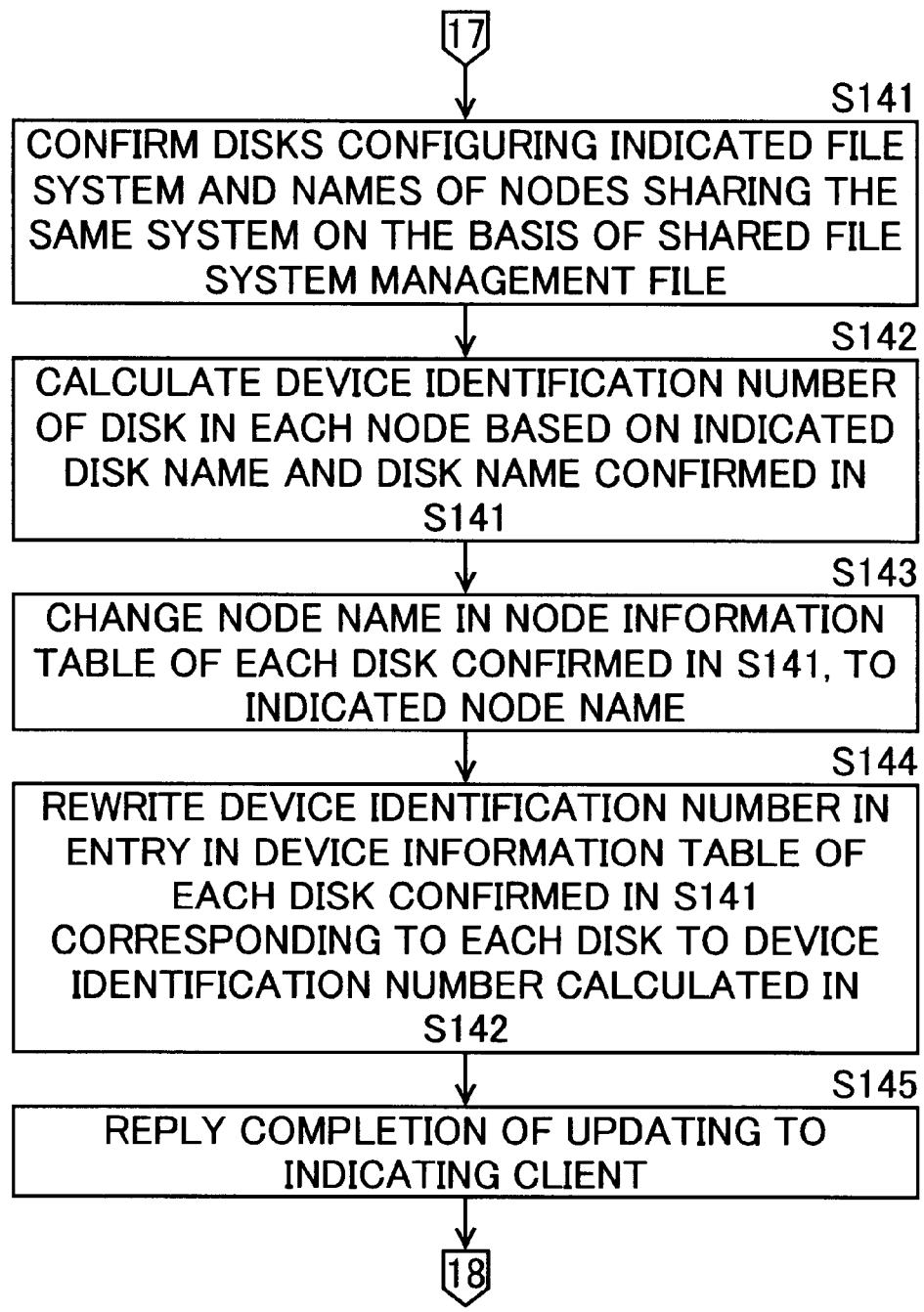
FIG. 24 is a flowchart showing a content of the processing by the file operation server.

FIG. 1 is a block diagram showing an outline of an architecture of a distributed processing system in this embodiment. As shown in FIG. 1, this distributed processing system is constructed of a plurality of computers (called "nodes", hereinafter) 2 connected to each other via a local area network (LAN) 1, and a plurality of disks 4 connected via a fiber channel 3 to the nodes 2.

The disk 4 is a part of a hard disk device having a disk array mechanism based on RAID (Redundant Arrays of Inexpensive Disk)0, RAID1 or RAID5. The disk 4 is one partition defined by logically partitioning an external storage area constructed of one single physical disk or a plurality of physical disks. There may be a case that it corresponds to one single whole disk and a case that it corresponds to a part of one single physical disk. Some or whole of a plurality of disks 4 (in FIG. 1, three among four disks 4) existing in the same hard disk device configure one shared disk system 5 shared by some or whole of nodes 2 configuring the distributed processing system. The disks 4 configuring the shared disk system 5 will hereinafter be particularly referred to as "shared disks". Note that the disks 4 which are not embraced by a certain shared disk system 5 may configure other shared disk system, or may be alternatively treated as standby disks unaccessible from any nodes 2.

FIG. 2 is a block diagram showing more-detailed internal structures of one arbitrary node 2 and of the shared disk 4 which configure the distributed processing system. As illustrated in FIG. 2, each shared disk 4 is stored with a node information table 41 and a device information table 42. Further, each node 2 is constructed mainly of a CPU 21, a network adapter 23, a RAM 24 and an input device 25, which are connected to each other via a bus B.

The network adapter 22 assembles the data received from the CPU 21 and addressed to other node 2 into packets and forwards the packets to the LAN 1. Further, the network adapter 22 deassembles the packets flowing on the LAN 1 into a data format in which the CPU 21 is capable of processing the data, and notifies the CPU 21 of the thus restored data.

The input device 25 may be a keyboard and a pointing device by which an operator inputs a variety of commands etc.

The CPU 21 is a central processing unit for executing the control of the modes 2 as a whole, and actualizes a function as the control unit by reading a variety of programs stored in a hard disk 23 onto a RAM 24 and executing these programs in sequence.

The RAM 24 is a main storage device on which an operation area is developed by the CPU 21. The programs read from the hard disk serving as a computer readable medium onto the RAM 24 and executed by the CPU 21, are an operating system 240 and a variety of application programs unillustrated. This operating system 240 is UNIX, and functions as a client OS and a server OS as well in relation with other nodes 2. Namely, the distributed processing system in this embodiment is constructed based on a UNIX-based server/client system.

The operating system 240 contains a file operation client 241 and a file operation server 242 which is a module for operating shared file system 5 that will be explained later on, shared file system management file 243 which defines identification information of the shared disks (devices) 4 configuring the shared file system 5 and identification information of the nodes 2 sharing this shared file system 5, and a mount tab 244 as mount information for indicating whether or not the shared file system 5 defined by the shared file system management file 243 is to be mounted (accessible by) to its own node. Note that the file operation client 241 and the file operation server 242 are incorporated into the standard UNIX or may therefore be constructed as application programs outside the operating system 240. Further, the shared file system management file 243 and the mount tab 244 are stored in the RAM 24 by the operating system 240. An area in which the shared file system management file 243 is stored corresponds to a first storage area, and an area in which the mount tab 244 is stored corresponds to a second storage area.

The file operation client 241 is defined as a program serving as a control module for indicating batchwise operations of the shared file system 5 to the file operation server 242 of the self-node 2 and the file operation server 242 of other node 2 in accordance with a variety of commands inputted by the operator via the input device 5.

Further, the file operation server 242 is defined as a program serving as a control module for changing registered contents of the shared file system 5 by updating the shared file system management file 243 of the self-node 2, and the node information table 41 and the device information table 42 within each shared disk 4 in accordance with an indication given from the file operation client 241 of the own node 2 or other node 2 and for mounting or unmounting the shared file system 5 to its own node by changing descriptions in the mount tab 244.

Next, contents of the shared file system management file 243 within each node 2 and of the node information table 41 and the device information table 42 in each shared disk 4, will be described with reference to FIGS. 3 through 5.

The contents of the shared file system management file 243 are common throughout all the nodes 2 configuring the distributed processing system as an object of a cluster service. To be specific, as shown in FIG. 3, this shared file system management file 243 has, for every shared file system 5 existing in the distributed processing system, entries in which register an identification number (a shared file system identification number: FSID) of the shared file system 5, a name (a node name: node) of the node 2 sharing the same shared file system 5, a name (a device name: Device) of the shared disk 4 configuring the same shared file system 5. FIG. 3 explanatorily shows only one entry registered with one single shared file system 5 given FSID=1. If only as a node name of its own node is registered in the shared file system management file 243 and the shared file system identification information corresponding to this node name is written to the mount tab 244, the operating system 240 accesses the shared disk 4 identified by the device name written in the same entry as that node name.

The contents of the node information table 41 are common throughout all the shared disks 4 configuring the same shared file system 5. Namely, the node names of all the nodes 2 configuring the shared file system 5 constructed of the shared disks 4 are listed in the node data table 41.

The contents of the device information table 42 are common throughout all the shared disks 4 configuring the same shared file system 5. More specifically, in the device information table 42, the entries are prepared for each of all the shared disks 4 configuring the shared file system 5 including that shared disk 4 having the table 42. In each of those entries, for every node 2 sharing the shared file system 5, the identification number (the device identification number) used when that node 2 accesses the shared disk 4 corresponding to the entry is listed. Note that each of the device identification numbers is univocally calculated by executing a predetermined arithmetic operation with respect to the node name and the device name.

Content of Processing by File Operation Client

Next, a content of processing executed by the CPU 21 functioning as the file operation client 241 will be explained with reference to FIGS. 6 through 12.

The file operation client 241 waits for commands to be inputted by the operator via the input device 25 in S001 immediately after a start. The commands for which the file operation client 241 waits in S001 are "mount request", "node addition", "node deletion", "disk addition", "disk deletion" and "node change". The "mount request" command contains as an operand a shared file system identification number. Further, the "node addition" command contains as operands a node name to be added and a shared file system identification number. The "node deletion" command contains as operands a node name to be deleted and a shared file system identification number. Moreover, the "disk addition" command contains as operands device name to be added and a shared file system identification number. The "disk deletion" command contains as operands a device name to be deleted and a shared file system identification number. The "node change" command contains a shared file system identification number to be changed and names of all the nodes after being changed. Then, when the "mount request" command is inputted, the processing proceeds to S002. When the "node addition" command is inputted, the processing goes forward to S004. When the "node deletion" command is inputted, the processing advances to S007. When the "disk addition" command is inputted, the processing goes forward to S010. When the "disk deletion" command is inputted, the processing proceeds to S013. When the "node change" command is inputted, the processing goes forward to S016.

In S002, the file operation client 241 confirms all the node names corresponding to the shared file system identification number designated in the command on the basis of the shared file system management file 243.

In next step S003, the file operation client 241 indicates mounting of the shared file system 5 identified by the shared file system identification number designated in the command, to the file operation server 242 of the node 2 shown by the node name confirmed in S002, which is a mount indication. Upon a completion of S003, the file operation client 241 returns the processing to S001.

On the other hand, in S004 executed when the "node addition" command is inputted, the file operation client 241 indicates the file operation servers 242 of all the nodes 2 configuring the distributed processing system to add the node name designated in the command to the entry in the shared file system management file 243 corresponding to the shared file system identification number designated in the command, which is an adding indication of a node name to the shared file system management file.

In next step S005, the file operation client 241 indicates the file operation server 242 of its own node 2 to add a node to the shared file system 5, which is an adding indication of a node to the shared file system.

In next step S006, the file operation client 241 waits for all the file operation servers 242 indicated to execute the adding process in S006 and S005 to make a response of completing the process. Then, when all the file operation servers 242 reply the completion of the process, the file operation client 241 advances the processing to S002 and executes a process for mounting.

On the other hand, in S007 executed when the "node deletion" command is inputted, the file operation client 241 indicates the file operation servers 242 of all the nodes 2 configuring the distributed processing system to delete the node name designated in the command from the entry in the shared file system managementfile 243 corresponding to the shared file system identification number designated in the command, which is a deleting indication of a node name from the shared file system management file.

In next step S008, the file operation client 241 indicates the file operation server 242 of its own node 2 to delete a node from the shared file system 5, which is a deleting indication of a node to the shared file system.

In next step S009, the file operation client 241 waits for all the file operation servers 242 indicated to execute the deleting process in S007 and S008 to make a response of completing the process. Then, when all the file operation servers 242 reply the completion of the process, the file operation client 241 advances the processing to S002 and executes the process for mounting.

On the other hand, in S010 executed when the "disk addition" command is inputted, the file operation client 241 indicates the file operation servers 242 of all the nodes 2 configuring the distributed processing system to add a device name designated in the command to the entry in the shared file system management file 243 corresponding to the shared file system identification number designated in the command, which is an adding indication of a device name to the shared file system management file.

In next step S011, the file operation client 241 indicates the file operation server 242 of the self-node 2 to add a disk to the shared file system 5, which is an adding indication of a disk to the shared file system.

In next step S012, the file operation client 241 waits for all the file operation servers 242 indicated to execute the adding process in S010 and S011 to make a response of completing the process. When all the file operation servers 242 reply the completion of the process, the file operation client 241 makes the processing proceed to S002 and executes the process for mounting.

On the other hand, in S013 executed when the "disk deletion" command is inputted, the file operation client 241 indicates the file operation servers 242 of all the nodes 2 configuring the distributed processing system to delete a device name designated in the command from the entry in the shared file system management file 243 corresponding to the shared file system identification number designated in the command, which is a deleting indication of a device name from the shared file system management file.

In next step S014, the file operation client 241 indicates the file operation server 242 of its own node 2 to delete a disk from the shared file system 5, which is a deleting indication of a disk form the shared file system.

In next step S015, the file operation client 241 waits for all the file operation servers 242 indicated to execute the deleting process in S013 and S014 to make a response of completing the process. When all the file operation servers 242 reply the completion of the process, the file operation client 241 advances the processing to S002 and executes the process for mounting.

On the other hand, in S016 executed when the "node change" command is inputted, the file operation client 241 indicates the file operation servers 242 of all the nodes 2 configuring the distributed processing system 5 to change all the node names in the entry corresponding to the shared file system identification number designated in the command in the shared file system management file 243 to a node name designates in the command, which is a changing indication of a node name in the shared file system management file.

In next step S017, the file operation client 241 indicates the file operation server 242 of its own node 2 to change the node in the shared file system 5, which is a changing indication of a node in the shared file system.

In next step S018, the file operation client 241 waits for all the file operation servers 242 indicated to execute the changing process in S016 and S017 to make a response of completing the process. When all the file operation servers 242 reply the completion of the process, the file operation client 241 advances the processing to S002 and executes the process for mounting.

The file operation client 241 repeatedly executes the processes in S001 through S018 described above.

Content of Processing by File Operation Server

Next, a content of processing executed by the CPU 21 functioning as the file operation saver 242 will be explained with reference to FIGS. 13 through 24.

The file operation server 242 waits for an indication from the file operation client 241 of the self-node 2 or other node 2 in S101 immediately after a start. When the mount indication (see S003) is given, the file operation server 242 advances the processing to S102. When the adding indication (see S004) of a node name to the shared file system management file is given, the processing proceeds to S107. When the adding indication (see S005) of a node to the shared file system management file is given, the processing proceeds to S110. When deleting indication (see S007) of the node name from the shared file system management file is given, the file operation server 242 advances the processing to S115. When the deleting indication (see S008) of a node from the shared file system management file is given, the file operation server 242 advances the processing to S118. When the adding indication (see S010) of a device name to the shared file system management file is given, the processing proceeds to S122. When the adding indication (see S011) of a disk to the shared file system management file is given, the processing proceeds to S125. When the deleting indication (see S013) of a device name from the shared file system management file is given, the file operation server 242 advances the processing to S132. When the deleting indication (see S014) of a disk from the shared file system management file is given, the file operation server 242 advances the processing to S134. When the changing indication (see S016) of a node name in the shared file system management file is given, the file operation server 242 advances the processing to S138. When the changing indication (see S017) of a node in the shared file system management file is given, the file operation server 242 advances the processing to S141.

In S102, the file operation server 242 confirms all the device names registered in the same entry in the shared file system management file 243 as the shared file system identification number designated from the file operation client 241.

In next step S103, the file operation server 242 calculates a device identification number of each of the shared disks 4 in its own the self-node 2 by performing a predetermined arithmetic operation with respect to the node name of its own node and the device name of each of the shared disks 4 that is confirmed in S102.

In next step S104, the file operation server 242 reads the device data table 42 from each shared disk 4 identified by each device name confirmed in S102. Then, the file operation server 242 reads the device identification number in its own node 2 from the entry of the shared disk 4 itself in the device data table 42. Subsequently, the file operation server 242 compares the thus read device identification number with the device identification number calculated in S103 with respect to that shared disk 4.

In next step S105, the file operation server 242 checks whether or not those two device identification numbers are coincident with each other as a result of the comparison in S104. Then, if not coincident with each other, the file operation server 242 judges that some sort of error occurs, and returns the processing to S101. Whereas if coincident with each other, the file operation server 242 writes the file system identification number indicated from the file operation client 241 to the mount tab 244 in S106, and thereafter sets the processing back to S101. As a result, the shared file system identified by the file system identification number written to the mount tab 244 comes to a mount state.

On the other hand, in S107 executed when the adding indication of a node mane to the shared file system management file 243 is given, the file operation server 242 erases from the mount tab 244 the file system identification number indicated from the file operation client 241 by temporarily stopping the cluster service. As a result, the shared file system 5 identified by this file system identification number is thereby temporarily brought into an unmount state.

In next step S108, the file operation server 242 adds the node name indicated from the file operation client 241 to the entry in the shared file system management file 243 corresponding to the file system identification number indicated from the file operation client 241.

In next step S109, the file operation server 242 makes a response of a completion of updating the shared file system management file 243 to the indicating file operation client 241. Upon a completion of S109, the file operation server 242 returns the processing to S101.

On the other hand, in S110 executed when the adding indication of a node to the shared file system 5 is given, the file operation server 242 confirms all the device names registered in the same entry in the shared file system management file 243 as the shared file system identification number indicated from the file operation client 241.

In next step S111, the file operation server 242 calculates a device identification number of each shared disk 4 in the indicated node 2 by executing a predetermined arithmetic operation with respect to the node name indicated from the file operation client 241 and each device name confirmed in S110.

In next step S112, the file operation server 242 adds the node name indicated from the file operation client 241 to the node information tables 41 of all the shared disks 4 identified by the respective device names confirmed in S110.

In next step S113, the file operation server 242 adds the device identification numbers calculated in S111 to the entries of the shared disks 4 in the device information tables 42 of all the shared disks 4 identified by the device names confirmed in S110.

In S114, the file operation server 242 makes a response of a completion of updating the node information table 41 and the device information table 42 to the indicating-side file operation client 241. When the process of S114 is completed, the file operation server 242 returns the processing to S101.

On the other hand, in S115 executed when the node name deleting indication of a node name from the shared file system management file 243 is given, the file operation server 242 erases the file system identification number indicated from the file operation client 241 from the mount tab 244, temporarily stopping the cluster service. As a result, the shared file system 5 identified by this file system identification number is temporarily brought into the unmount state.

In next step S116, the file operation server 242 deletes the node name indicated from the file operation client 241 out of the entry in the shared file system management file 243 corresponding to the file system identification number indicated from the file operation client 241.

In next step S117, the file operation server 242 makes a response of a completion of updating the shared file system management file 243 to the indicating-side file operation client 241. Upon a completion of S117, the file operation server 242 returns the processing to S101.

On the other hand, in S118 executed when the deleting indication of a node from the shared file system 5 is given, the file operation server 242 confirms all the device names registered in the same entry in the shared file system management file 243 as the shared file system identification number indicated from the file operation client 241.

In next step S119, the file operation server 242 deletes the node name indicated from the file operation client 241 out of the node information tables 41 of all the shared disks 4 identified by the respective device names confirmed in S118.

In next step S120, the file operation server 242 deletes all the-device identification numbers related to the node name indicated from the file operation client 241 out of each of the entries corresponding to the shared disks 4 in the device information tables 42 of all the shred disks 4 identified by the device names confirmed in S110.

In S121, the file operation server 242 makes a response of a completion of updating the node information table 41 and the device information table 42 to the indicating-side file operation client 241. When the process of S121 is completed, the file operation server 242 returns the processing to S101.

On the other hand, in S122 executed when the adding indication of a device name to the shared file system management file 243 is given, the file operation server 242 erases the file system identification number indicated from the file operation client 241 from the mount tab 244, while temporarily stopping the cluster service. The shared file system 5 identified by this file system identification number is thereby temporarily brought into the unmount state.

In next step S123, the file operation server 242 adds the device name indicated from the file operation client 241 to the entry in the shared file system management file 243 corresponding to the file system identification number indicated from the file operation client 241.

In next step S124, the file operation server 242 makes a response of a completion of updating the shared file system management file 243 to the indicating file operation client 241. Upon a completion of S124, the file operation server 242 returns the processing to S101.

On the other hand, in S125 executed when the adding indication of a disk to the shared file system 5 is given, the file operation server 242 confirms all the device names and all the node names registered in the same entry in the shared file system management file 243 as the shared file system identification number indicated from the file operation client 241.

In next step S126, the file operation server 242 calculates a device identification number of the indicated shared disk 4 used in the node 2 by executing a predetermined arithmetic operation with respect to the device name indicated from the file operation client 241 and the node name confirmed in S125.

In next step S127, the file operation server 242 adds the device identification numbers calculated in S126 to the entries corresponding to the respective shared disks 4 in the device information tables 42 of all the shared disks 4 identified by the device names confirmed in S125.

In next step S128, the file operation server 242 copies into the shared disk 4 identified by the device name indicated from the file operation client 241, the device information tables 42 and the node information tables 41 of other shared disks 4 which have been updated in S127.

In next step S129, the file operation server 242 makes a response of a completion of updating the device data table 42 to the indicating file operation client 241. When process of S129 is completed, the file operation server 242 returns the processing to S101.

On the other hand, in S131 executed when the deleting indication of a device name from the shared file system management file 243 is given, the file operation server 242 erases the file system identification number indicated from the file operation client 241 from the mount tab 244 while temporarily stopping the cluster service. As a result, the shared file system 5 identified by this file system identification number is thereby temporarily brought into the unmount state.

In next step S132, the file operation server 242 deletes the device name indicated from the file operation client 241 out of the entry in the shared file system management file 243 corresponding to the file system identification number indicated from the file operation client 241.

In next step S133, the file operation server 242 makes a response of a completion of updating the shared file system management file 243 to the indicating file operation client 241. Upon a completion of S133, the file operation server 242 returns the processing to S101.

On the other hand, in 5134 executed when the deleting indication of a disk from the shared file system 5 is given, the file operation server 242 confirms all the device names registered in the same entry in the shared file system management file 243 as the shared file system identification number indicated from the file operation client 241.

In next step S135, the file operation server 242 deletes all the device names indicated from the file operation client 241 out of each of the entries corresponding the respective shared disks 4 in the device information tables 42 of all the shared disks 4 identified by the respective device names confirmed in S134.

In next step S136, the file operation server 242 makes a response of a completion of updating the device data table 42 to the indicating file operation client 241. When S136 is completed, the file operation server 242 returns the processing to S101.

On the other hand, in S138 executed when the changing indication of a node name in the shared file system management file 243 is given, the file operation server 242 erases the file system identification number indicated from the file operation client 241 from the mount tab 244, while temporarily stopping the cluster service. As a result, the shared file system 5 identified by this file system identification number is thereby temporarily brought into the unmount state.

In next step S139, the file operation server 242 replaces all the node names registered in the same entry in the shared file system management file 243 as the shared file system identification number indicated from the file operation client 241, with the node names indicated from the file operation client 241.

In next step S140, the file operation server 242 makes a response of a completion of updating the shared file system management file 243 to the indicating file operation client 241. When the process of S140 is completed, the file operation server 242 returns the processing to S101.

On the other hand, in S141 executed when the changing indication of a node in the shared file system 5 is given, the file operation server 242 confirms all the device names and all the file names registered in the same entry in the shared file system management file 243 as the shared file system identification number indicated from the file operation client 241.

In next step S142, the file operation server 242 calculates a device identification number of the indicated shared disk 4 used in the indicated node 2 by executing a predetermined arithmetic operation with respect to each of the node names indicated from the file operation client 241 and each of the device names confirmed in S141.

In next step S143, the file operation server 242 replaces all the node names registered in the node information tables 41 of all the shared disks 4 identified by the device names confirmed in S141, with the node names indicated from the file operation client 241.

In next step S144, the file operation server 242 replaces all the device identification numbers in the entries of the shared disks 4 in the device data tables 42 of all the shared disks 4 identified by the device names confirmed in S141, with the device identification numbers calculated in S142.

In next step S145, the file operation server 242 makes a response of a completion of updating the node information table 41 and the device information table 42 to the indicating file operation client 241. When the process of S145 is completed, the file operation server 242 returns the processing to S101.

The file operation server 242 repeatedly executes the processes in S101 through S145 described above.

Operation of the Embodiment

An explanation of how the distributed processing system having the architecture discussed above in this embodiment operates each time the command is inputted to the node 2, will hereinafter be made.

(Mount)

Figure 25:
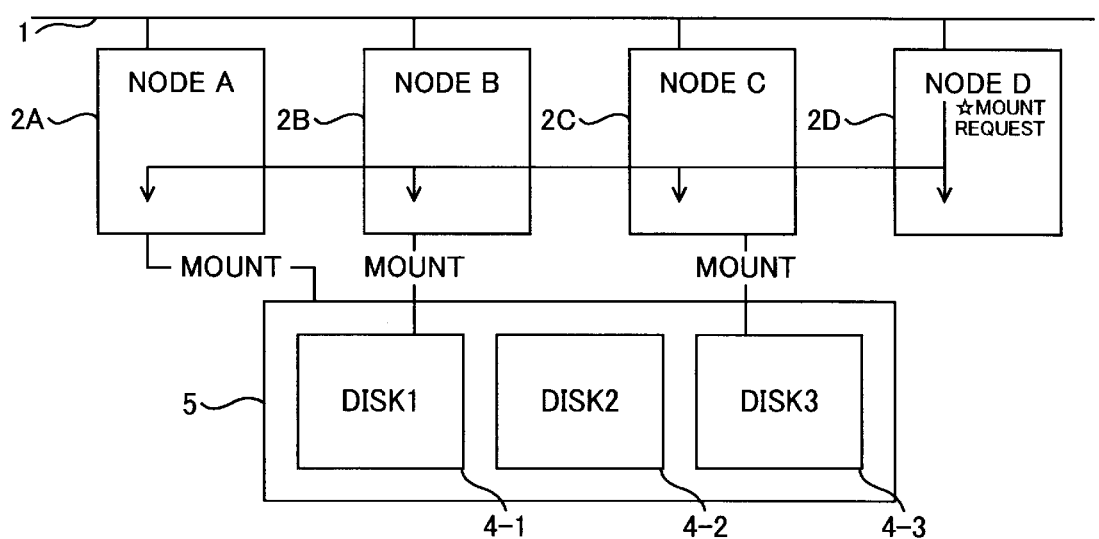
FIG. 25 is an explanatory diagram showing a mounting process.

To start with, there will be explained a case of the "mount request" command inputted after the cluster service starting (see FIG. 25). The discussion shall be made on the premise that only the shared file system 5 identified by the file system identification number: FSID=1, exists in the distributed processing system, that this shared file system 5 is constructed of only the shared disks 4-1~4-3 having the device names: device=DISK1~DISK3, and that only the nodes 2A~2C having the node names: node=node A~node C share the shared file system 5 with each other. Accordingly, with a known mkfs (make file system) command being issued, the shared file system management table 243 of which content is shown in FIG. 3 is registered in each of the four nodes 2A~2D configuring the distributed processing system including the node 2D that does not share the shared file system 5. Similarly, the node information table 41 having the content shown in FIG. 4 and the device information table 42 with its content shown in FIG. 5 are registered in each of the shared disks 4-1~4-3 configuring the shared file system 5.

It is assumed in this state that the operator inputs the mount request command (mount FS1) with respect to FSID=1 to the node 2D.

Then, the file operation client 241 of the node 2D recognizes that the node names corresponding to FSID=1 are node A, node B and node C with reference to the shared file system management table 243 (S002). Subsequently, the file operation client 241 indicates the mount request with respect to FSID=1 to the nodes 2A~2C identified by these node names (S003).

The file operation servers 242 of the nodes 2A~2C having received this indication recognize that the device names corresponding to FSID=1 are DSK1~DSK3 with reference to the shared file system management table 243 (S102). Then, the file operation server 242 calculates the device identification numbers of the shared disks 4-1~4-3 used in the nodes 2A~2C by performing the predetermined arithmetic operation with respect to the node name of its own node and the disk names DISK1~DISK3 (S103). Thereafter, with respect to each of the shared disks 4-1~4-3, the file operation server 242 reads the entry corresponding to each of the shared disks 4-1~4-3 from the device information table, and checks whether or not the its own node device identification number written to the read-out entry is coincident with the device identification number calculated by the server 242 itself (S104, S106). Then, if capable of confirming that these two device identification numbers are coincident, the file operation server 242 judges that the contents (the shared disks 4-1~4-3 ) of the shared file system which is indicated to be mounted are coincident with the contents of the shared file system 5 registered by itself, and writes the file system identification number: FSID=1 of the shared file system 5 to its own mount tab 244, thus completing the mount of the shared file system 5 (S106).

(Node Addition)

Figure 28:
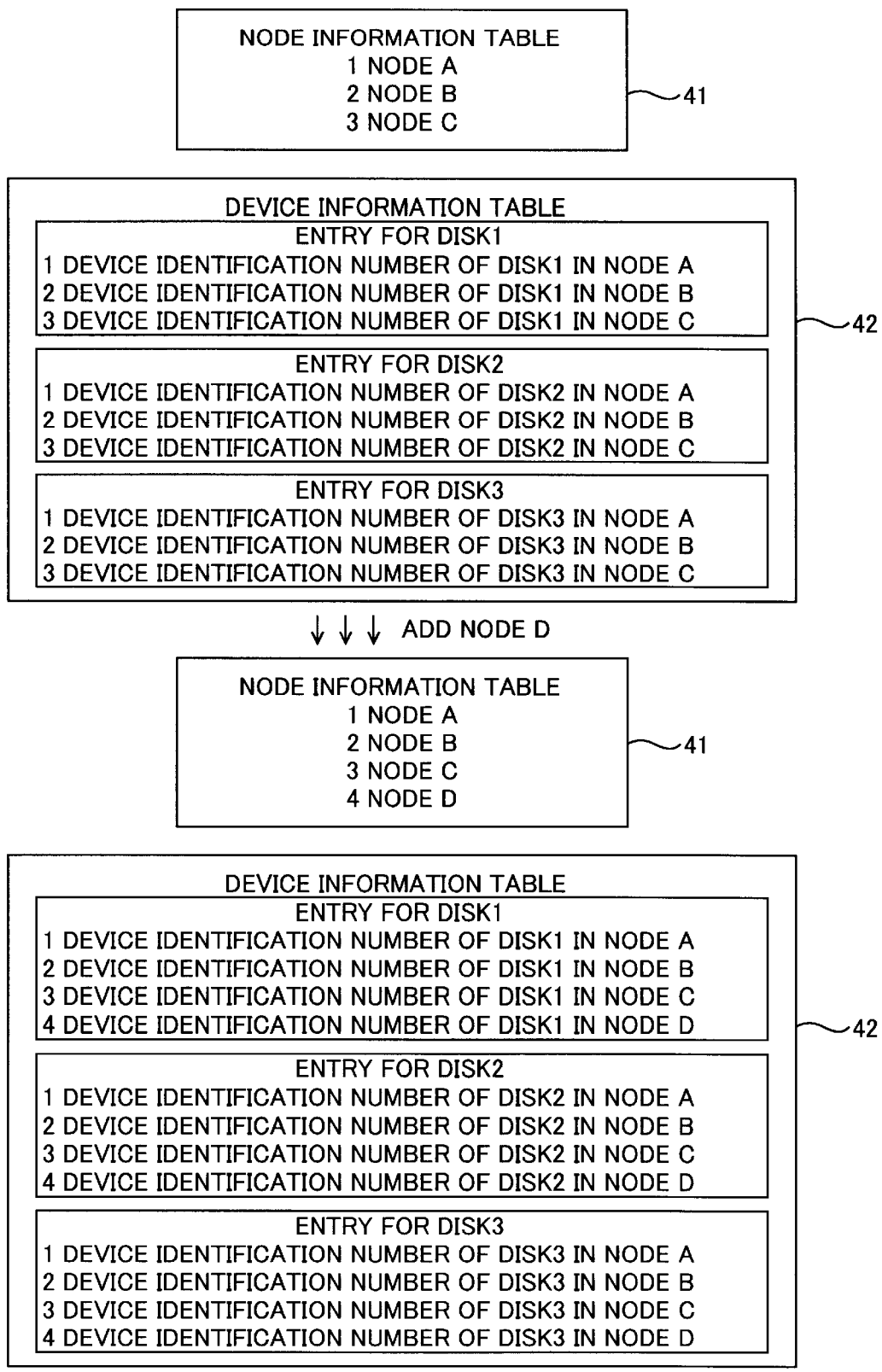
FIG. 28 is an explanatory diagram showing update of a node information table and a device information table when the node added.

Next, there will be explained a case of the "node addition" command inputted in a state where the shared file system 5 is registered with the contents shown in the shared file system management table 243 in FIG. 3 and mounted (see FIGS. 26~28).

When the operator inputs the "node addition" command (sfcnode -a node D FS1) for adding the node 2D with respect to FSID=1 to the node 2D, the file operation client 241 in the node 2D indicates all the nodes 2A~2D within the distributed processing system to add the node name=nodeD with respect to FSID=1 (S004).

The file operation server 242 in each of the nodes 2A~2D having received this indication, temporarily sets the shared file system 5 in the unmount state by erasing the file system identification number: FSID=1 from the mount tab 244 (S107), and thereafter adds the node name=nodeD to the entry of FSID=1 in the shared file system management table 243 (S108, see FIG. 27), thus making a response of a completion of updating to the indicating file operation client 241 (S109).

Further, the file operation client 241 in the node 2D indicates the file operation server 242 in its own node 2D to add the node 2D to the shared file system 5 (S005).

The file operation server 242 in the node 2D having received this indication recognizes that the device names corresponding to FSID=1 are DISK1~DISK3 by referring to the shared file system management table 243 (S110). Then, the file operation server 242 calculates the device identification numbers of the shared disks 4-1~4-3 used in the node 2D by performing the predetermined arithmetic operation with respect to the node name=nodeD that is indicated to be added and the device names=DISK1~DISK 3 (S111). Thereafter, with respect to each of the shared disks 4-1~4-3, the file operation server 242 adds the node name: node D to the node information table 41 (S112, see FIG. 28), and adds the device identification number used in the node 2D to each entry of the device data table 42 (S113, see FIG. 28), thus making a response of a completion of updating to the file operation client 241 (S114).

Figure 26:
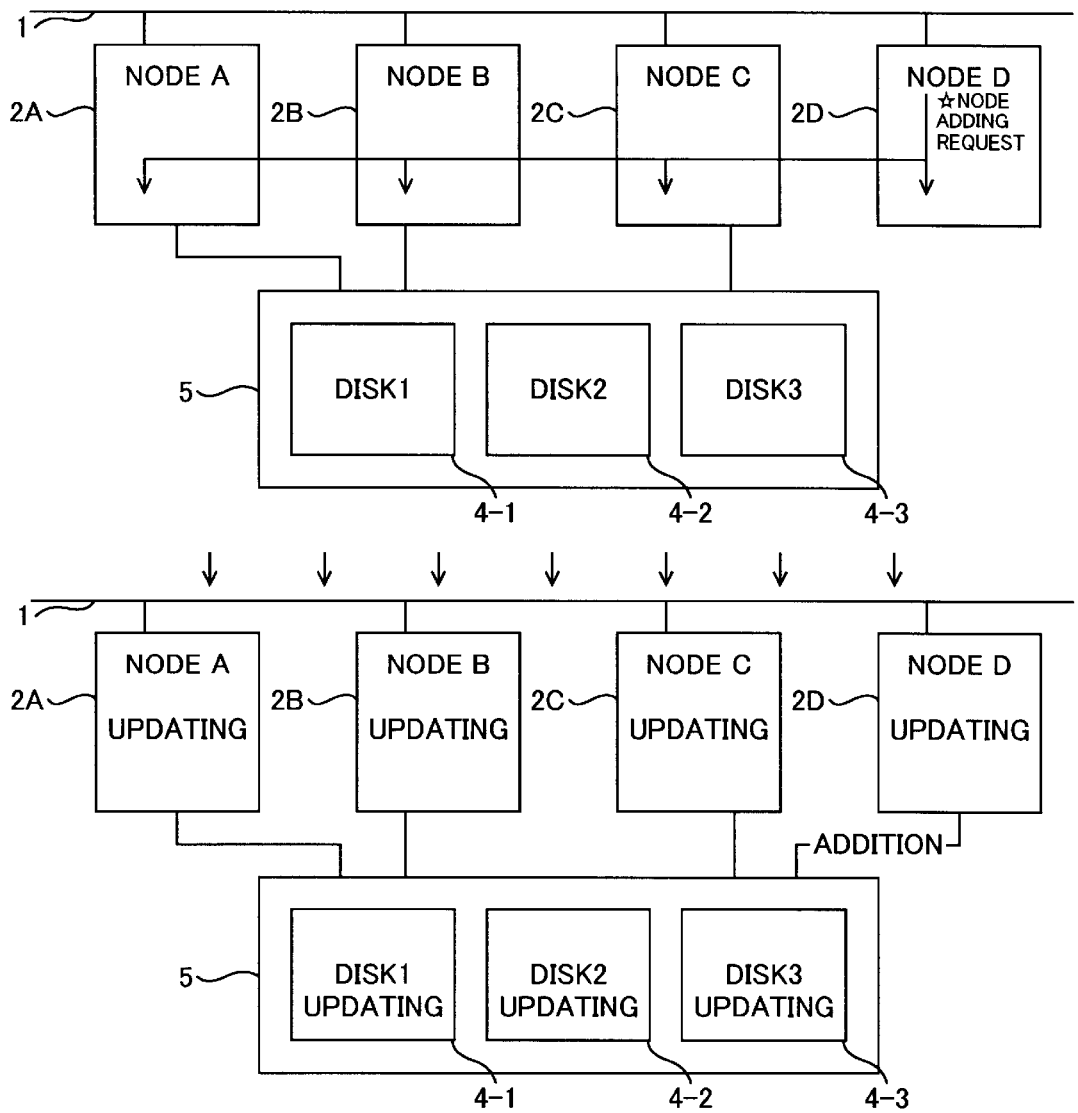
FIG. 26 is an explanatory diagram showing a node addition.

With the operation described above, the addition of the node 2D to the shared file system 5 can be reflected in each of the nodes 2A~2D and each of the disks 4-1~4-3 (see FIG. 26). After this reflection, the file operation client 241 in the node D successively and automatically executes the process for the mount described above, thereby indicating the respective nodes 2A~2D to mount the thus-reflected shared file system 5 (S003).

(Node Deletion)

Figure 31:
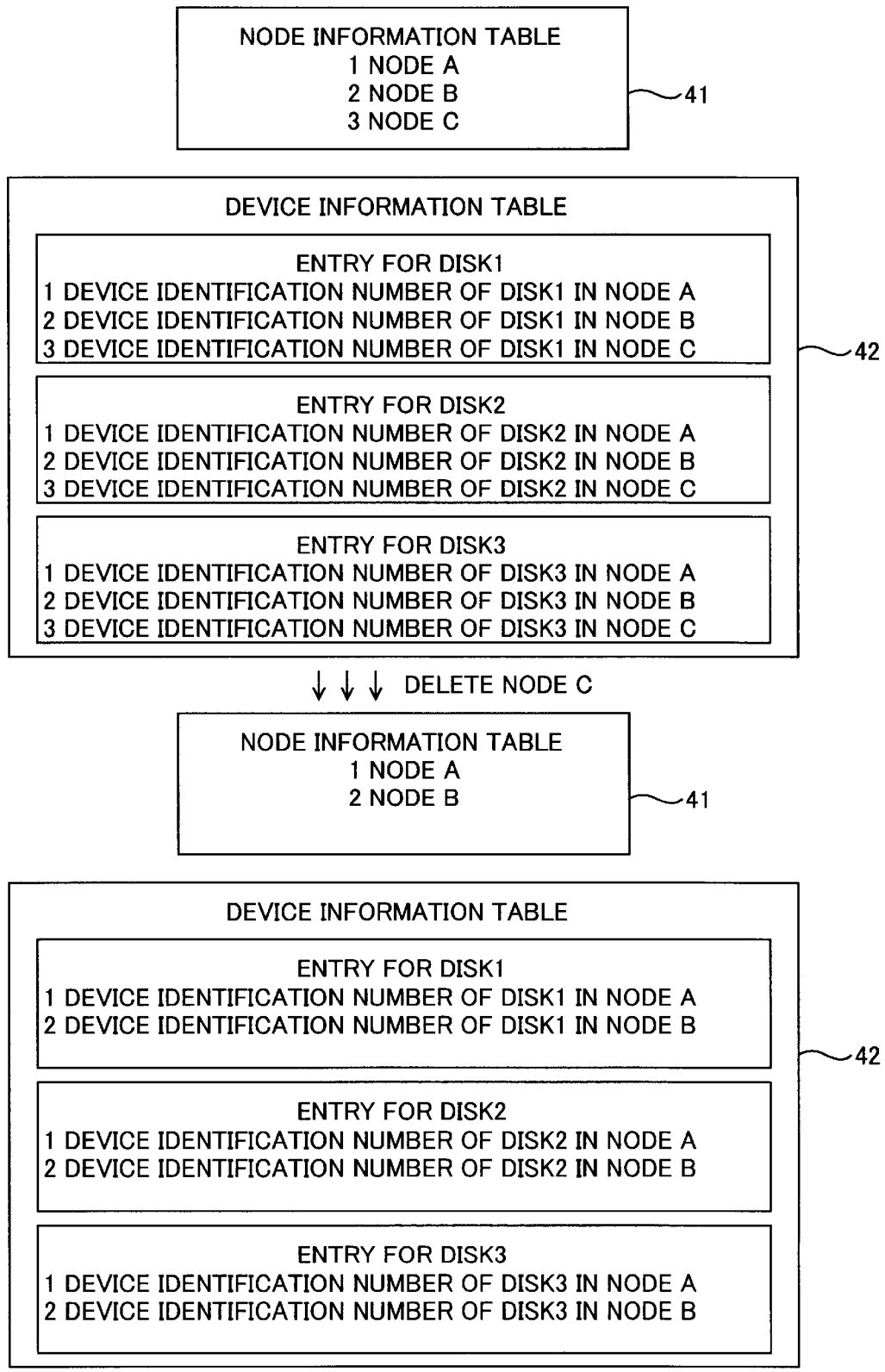
FIG. 31 is an explanatory diagram showing update of the node information table and the device information table when the node updated.

Next, there will be explained a case of the node deletion command inputted in the state where the shared file system 5 is registered with the contents shown in the shared file system management table 243 in FIG. 3 and mounted (see FIGS. 29~31).

When the operator inputs the "node deletion" command (sfcnode -d node C FS1) for deleting the node 2C with respect to FSID=1 to the node 2D, the file operation client 241 in the node 2D indicates all the nodes 2A~2D within the distributed processing system to delete the node name= nodec with respect to FSID=1 (S007).

The file operation server 242 in each of the nodes 2A~2D having received this indication, temporarily sets the shared file system 5 in the unmount state by erasing the file system identification number: FSID=1 from the mount tab 244 (S115), and thereafter deletes the node name=nodeC from the entry of FSID=1 in the shared file system management table 243 (S116, see FIG. 30), thus making a response of a completion of updating to the indicating file operation client 241 (S117).

Further, the file operation client 241 in the node 2D indicates the file operation server 242 in its own node 2D to delete the node 2C from the shared file system 5 (S008).

The file operation server 242 in the node 2D having received this indication recognizes that the device names corresponding to FSID=1 are DISK1~DISK3 by referring to the shared file system management table 243 (S118). Then, with respect to each of the shared disks 4-1~4-3, the file operation server 242 deletes the node name: node C from the node information table 41 (S119, see FIG. 31), and deletes the device identification number in the node 2C out of each entry of the device information table 42 (S120, see FIG. 31), thus making a response of a completion of updating to the file operation client 241 (S121).

Figure 29:
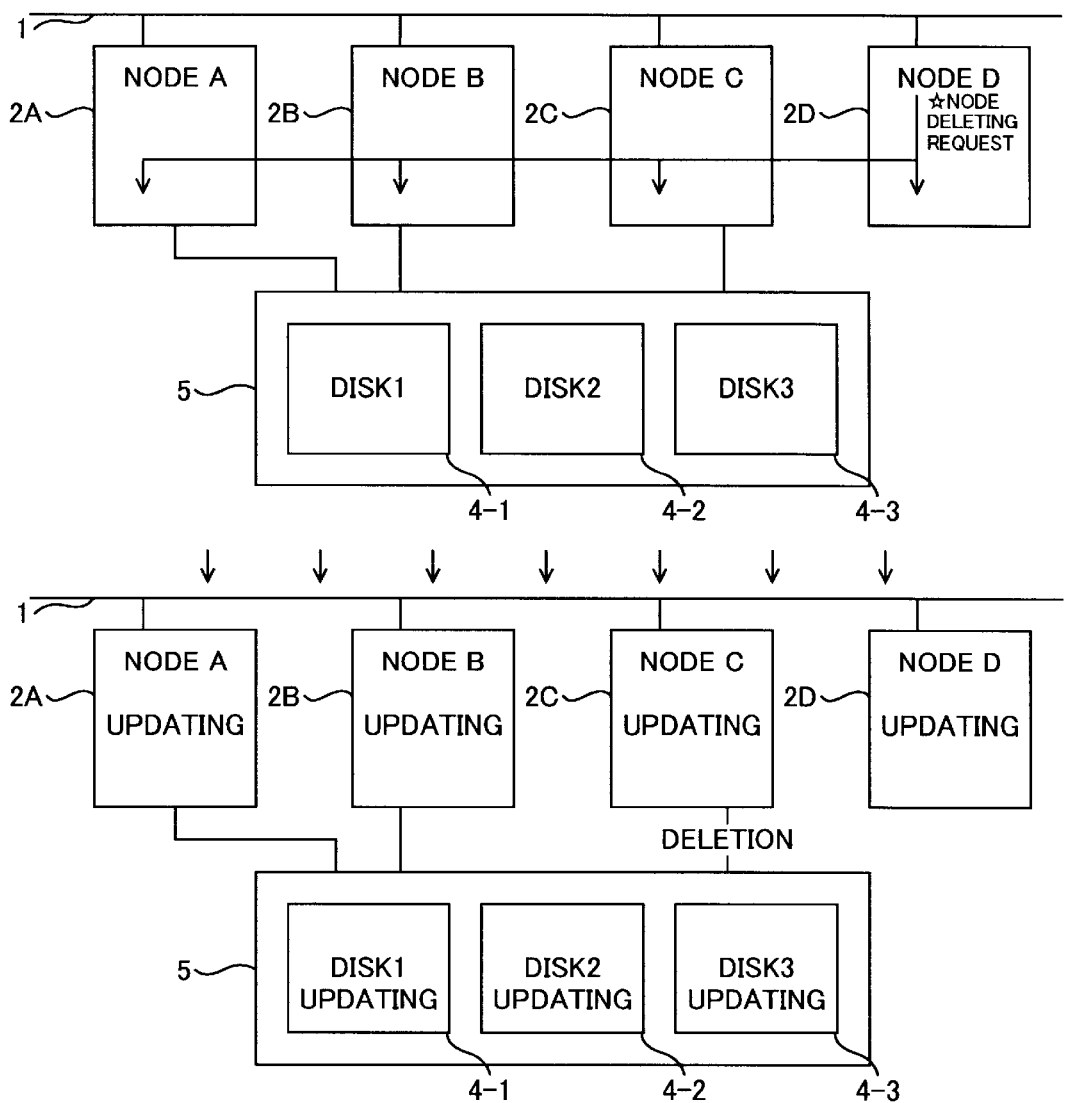
FIG. 29 is an explanatory diagram showing a node deletion.

With the operation described above, the deletion of the node 2C from the shared file system 5 can be reflected in each of the nodes 2A~2D and each of the disks 4-1~4-3 (see FIG. 29). After this reflection, the file operation client 241 in the node D successively and automatically executes the process for the mount described above, thereby indicating the respective nodes 2A~2D to mount the thus-reflected shared file system 5 (S003).

(Disk Addition)

Next, there will be explained a case of the "disk addition" command inputted in the state where the shared file system 5 is registered with the contents shown in the shared file system management table 243 in FIG. 3 and mounted (see FIGS. 32~34).

When the operator inputs the "disk addition" command (sfcadd -A DISK4 FSI) for adding the shared disk 4-4 with respect to FSID=1 to the node 2D, the file operation client 241 in the node 2D indicates all the nodes 2A~2D within the distributed processing system to add the device name= DISK4 with respect to FSID=1 (S010).

The file operation server 242 in each of the nodes 2A~2D having received this indication, temporarily sets the shared file system 5 in the unmount state by erasing the file system identification number: FSID=1 from the mount tab 244 (S122), and thereafter adds the device name=DISK4 to the entry of FSID=1 in the shared file system management table 243 (S123, see FIG. 33), thus making a response of a completion of updating to the indicating file operation client 241 (S124).

Further, the file operation client 241 in the node 2D indicates the file operation server 242 in its own node 2D to add the shared disk 4-4 to the shared file system 5 (S011).

The file operation server 242 in the node 2D having received this indication recognizes that the device names corresponding to FSID=1 are DISK1~DISK3 and the node names are node A~node C by referring to the shared file system management table 243 (S125). Then, the file operation server 242 calculates the device identification numbers of the shared disks 4-1~4-3 used in the nodes 2A~2D by performing the predetermined arithmetic operation with respect to the device name=DISK4 which is indicated to be added and the node names=node A~node C (S126). Thereafter, with respect to each of the shared disks 4-1~4-3, the file operation server 242 adds, the entry in which the device identification number of the shared disk 4~4 used in each of the nodes 2A~2C is listed to the device information tables 42 thereof (S127, see FIG. 34), and copies the device information table 42 to which the entry has been added and the node information table 41 to the shared disk 4-4 (S128, see FIG. 34), thus making a response of a completion of updating to the file operation client 241 (S114).

Figure 32:
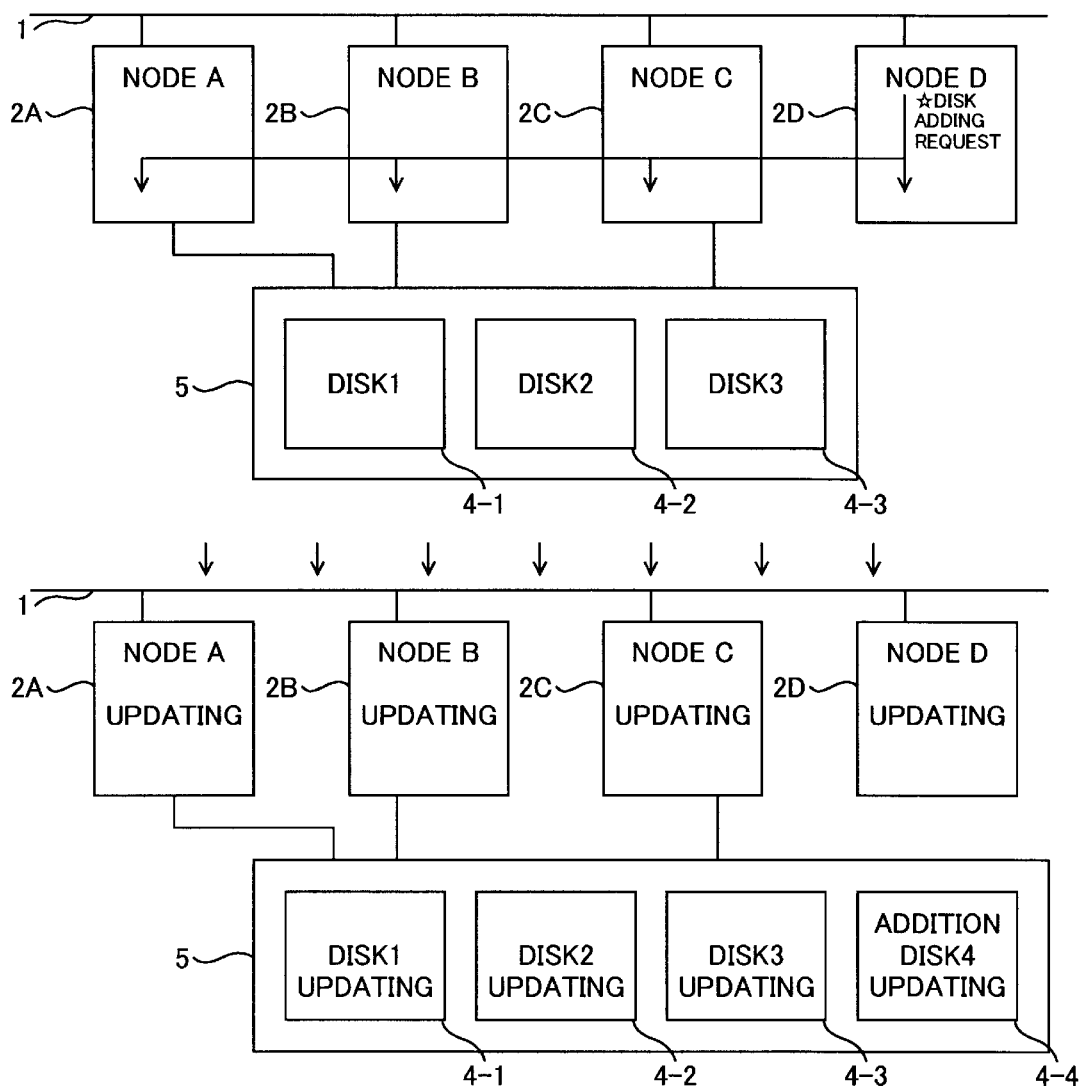
FIG. 32 is an explanatory diagram showing a disk addition.
Figure 33:
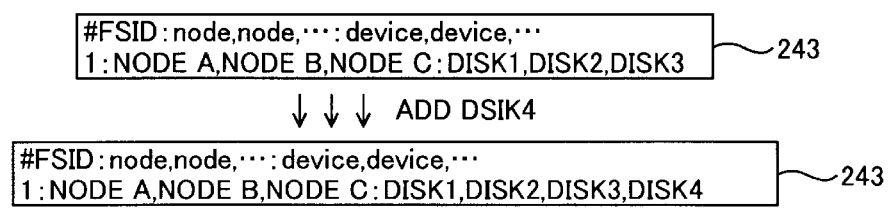
FIG. 33 is an explanatory diagram showing update of the shared file system management table when a disk added.

With the operation described above, the addition of the shared disk 4-4 to the shared file system 5 can be reflected in each of the nodes 2A~2D and each of the disks 4-1~4-4 (see FIG. 32). After this reflection, the file operation client 241 in the node D successively and automatically executing the process for the mount described above, thereby indicating the respective nodes 2A~2D to mount the thus-reflected shared file system 5 (S003).

(Disk Deletion)

Figure 36:
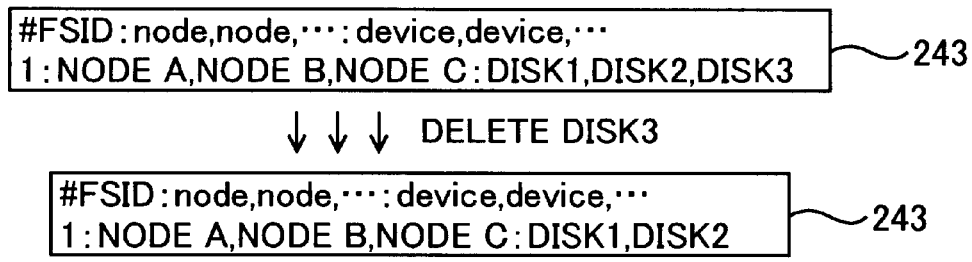
FIG. 36 is an explanatory diagram showing update of the shared file system management table when the disk deleted.
Figure 37:
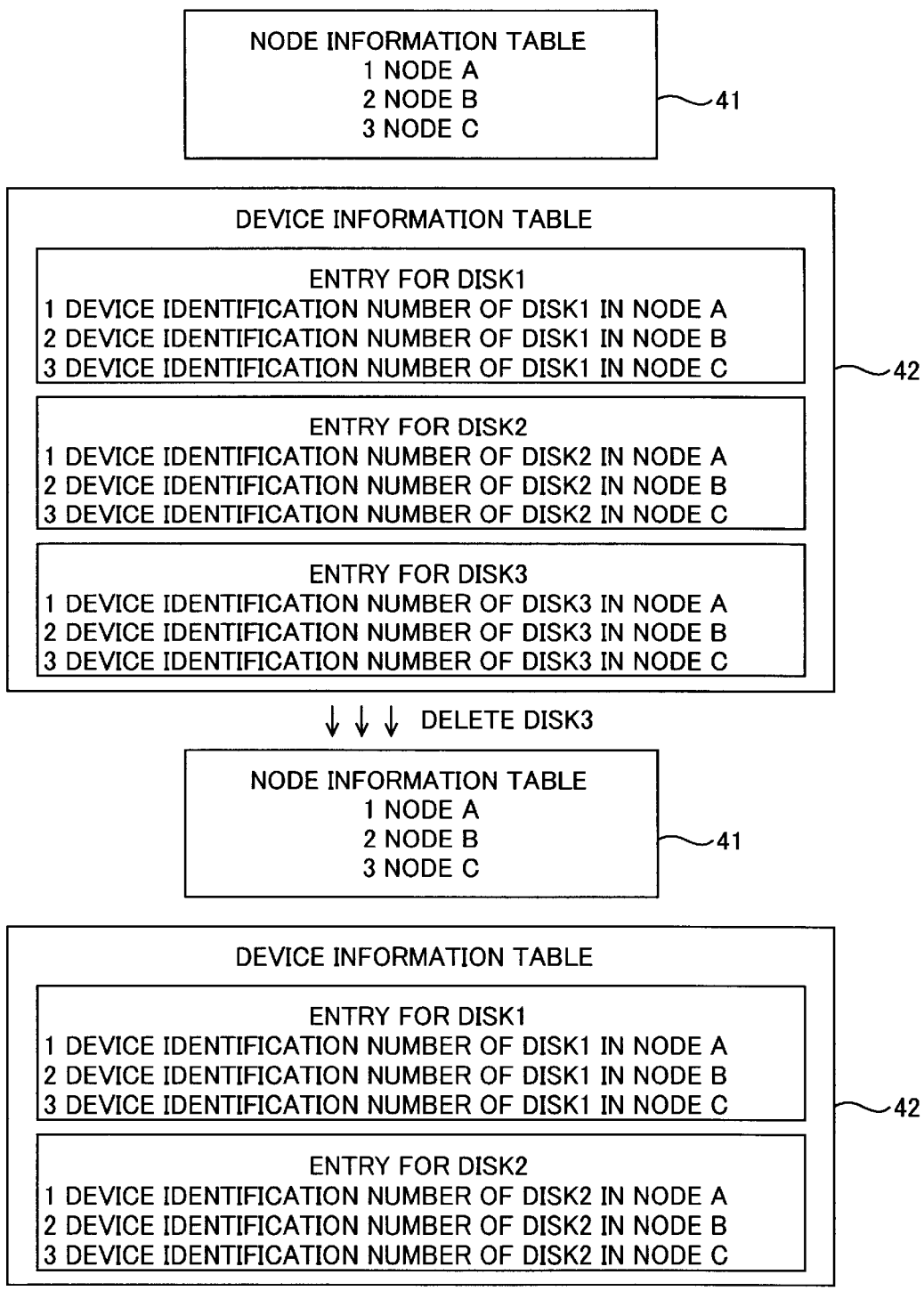
FIG. 37 is an explanatory diagram showing updated of the node information table and the device information table when the disk deleted.

Next, there will be explained a case of the "disk deletion" command inputted in the state where the shared file system 5 is registered with the contents shown in the shared file system management table 243 in FIG. 3 and mounted (see FIGS. 35~37).

When the operator inputs the "disk deletion" command (sfcnode -D DISK3 FS1) for deleting the shared disk 4-3 with respect to FSID=1 to the node 2D, the file operation client 241 in the node 2D indicates all the nodes 2A~2D within the distributed processing system to delete the device name=DISK3 with respect to FSID=1 (S013).

The file operation server 242 in each of the nodes 2A~2D having received this indication, temporarily sets the shared file system 5 in the unmount state by erasing the file system identification number: FSID=1 from the mount tab 244 (S131), and thereafter deletes the device name=DISK3 from the entry of FSID=1 in the shared file system management table 243 (S132, see FIG. 36), thus making a response of a completion of updating to the indicating file operation client 241 (S133).

Further, the file operation client 241 in the node 2D indicates the file operation server 242 in its own node 2D to delete the shared disk 4-3 from the shared file system 5 (S014).

The file operation server 242 in the node 2D having received this indication recognizes that the device names corresponding to FSID=1 are DISK1~DISK3 by referring to the shared file system management table 243 (S134). Then, with respect to each of the shared disks 4-1~4-3, the file operation server 242 deletes the entry corresponding to the shared disk 4-3 from the device information table 42 (S135, see FIG. 37), thus making a response of a completion of updating to the file operation client 241 (S136).

Figure 35:
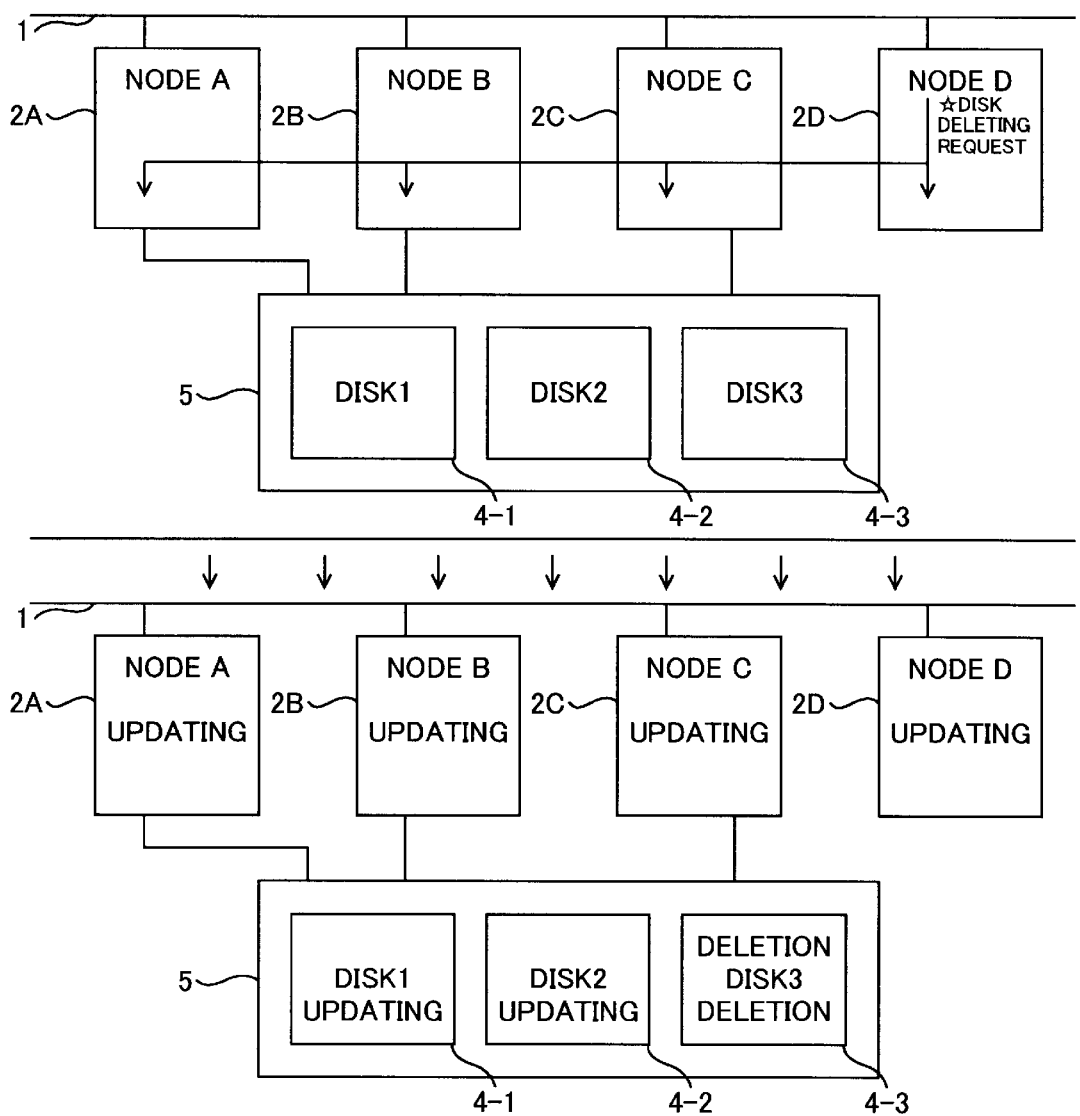
FIG. 35 is an explanatory diagram showing a disk deletion.

With the operation described above, the deletion of the shared disk 4-3 from the shared file system 5 can be reflected in each of the nodes 2A~2D and each of the disks 4-1~4-3 (see FIG. 35). After this reflection, the file operation client 241 in the node D successively and automatically executes the process for the mount described above, thereby indicating the respective nodes 2A~2D to mount the thus-reflected shared file system 5 (S003).

(Node Change)

Next, there will be explained a case of the "node change" command inputted in a state where the shared file system 5 is registered with the contents shown in the shared file system management table 243 in FIG. 3 and mounted (see FIGS. 38~40).

When the operator inputs the "node change" command for changing the nodes sharing the shared file system 5 to nodes 2E~2G with respect to FSID=1 to the node 2D, the file operation client 241 in the node 2D indicates all the nodes 2A~2E within the distributed processing system to change the node names to nodeE~nodeG with respect to FSID=1 (S016).

The file operation server 242 in each of the nodes 2A~2D having received this indication, temporarily sets the shared file system 5 in the unmount state by erasing the file system identification number: FSID=1 from the mount tab 244 (S138), and thereafter changes the node names node A~node C to node E~node G in the entry of FSID=1 in the shared file system management table 243 (S139, see FIG. 39), thus making a response of a completion of updating to the indicating file operation client 241 (S140).

Further, the file operation client 241 in the node 2D indicates the file operation server 242 in its own node 2D to change the nodes sharing the shared file system 5 to the nodes 2E~2G (S017).

The file operation server 242 in the node 2D having received this indication recognizes that the device names corresponding to FSID=1 are DISK1~DISK3 by referring to the shared file system management table 243 (S141). Then, the file operation server 242 calculates the device identification numbers of the shared disks 4-1~4-3 used in the nodes 2E~2G by performing the predetermined arithmetic operation with respect to the node names=node E~node G and the device names=DISK1~DISK3 (S142). Thereafter, with respect to each of the shared disks 4-1~4-3, the file operation server 242 changes the node names in the node information table 41 to node E~node G (S143, see FIG. 40), and rewrites the device identification number in each entry of the device information table 42 to the device identification number used in each of the nodes 2E~2G (S144, see FIG. 40), thus making a response of a completion of updating to the file operation client 241 (S145).

Figure 38:
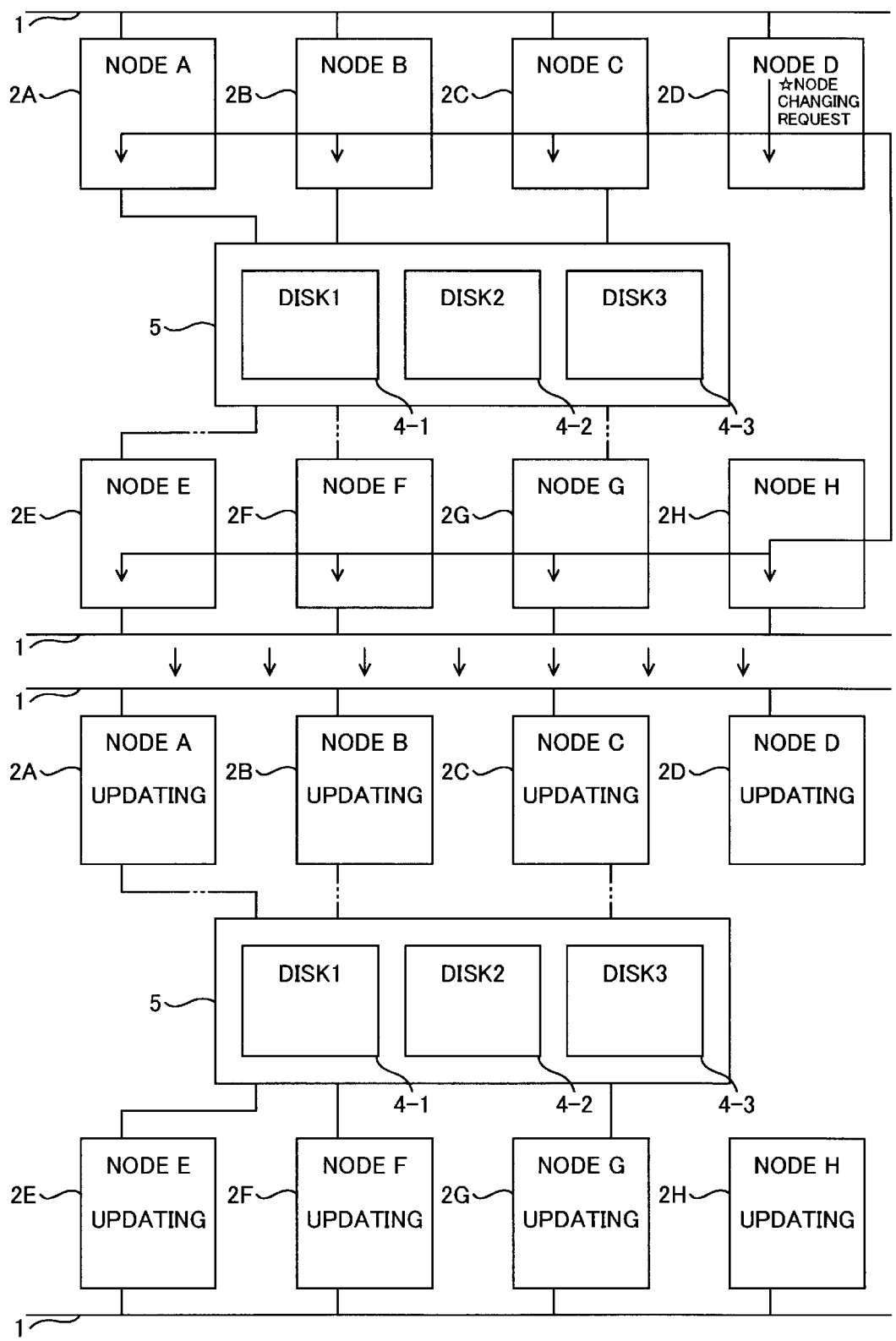
FIG. 38 is an explanatory diagram showing a node change.

With the operation described above, the change of the nodes sharing the shared file system 5 can be reflected in each of the nodes 2A~2D and each of the disks 4-1~4-3 (see FIG. 38). After this reflection, the file operation client 241 in the node D successively and automatically executes the process for the mount described above, thereby indicating the respective nodes 2A~2D to mount the thus-reflected shared file system 5 (S003).

Effects of the Embodiment

In the distributed processing system operating as discussed above in this embodiment, the system manager who is an operator has no necessity for executing the operations such as "mount", "node addition", "node deletion", "disk addition" and "disk deletion", with respect to the shared file system 5 individually for each of the nodes 2A~2G. If only the system manager inputs the operation commands relative to the shared file system 5 in any one of the nodes 2 configuring the distributed processing system, the file operation client 241 of this node 2 indicates the process necessary for the operation for the shared file system 5 to other node 2, and at the same time, indicates the file operation server 242 of the self-node 2 to update the node information table 41 and the device information table 42 with respect to each shared disk 4. Accordingly, loads of the system manager become by far smaller than that by the prior art system.

Note that the discussion has been made on the assumption that the commands are inputted to the node 4D which does not actually share the shared file system 5 in each of the examples described above, however, as obvious from the flowcharts, even if the operation commands are inputted to the nodes 2A~2C sharing in fact the shared file system 5, the file operation clients 241 of the nodes 2A~2C indicate the file operation servers 242 of the nodes 2A~2C to execute the file operation, whereby a desired result can be obtained. Hence, the loads of the system manager can be further reduced.

As discussed above, the distributed processing system according to the present invention is capable of executing the operation for the shared file system on the basis of the command input to one single node.

Although only a few embodiments of this invention have been described in detail above, those skilled in the art will readily appreciate that many modifications are possible in the preferred embodiments without departing from the novel teachings and advantages of this invention. Accordingly, all such modifications are intended to be included within the scope of this invention as defined by the following claims.

What is claimed is:

1. A distributed processing system having a plurality of nodes and at least one storage device connected to each other under a network environment, each of said nodes comprising:
    a storage unit for retaining a management file defining identification information of a storage device configuring a shared file system and identification information of said nodes sharing said shared file system; and
    a control module for updating the definitions in the management file,
    wherein said control module of at least one of said nodes indicates said control module of each of said nodes to update the management file retained in each of said storage units in accordance with a command inputted by an operator.

2. A distributed processing system according to claim 1, wherein said control module of each of said nodes indicates said control module of each of said nodes to update the management file retained in each of said storage units in accordance with a command inputted to its own node by an operator.

3. A distributed processing system according to claim 1, wherein said control module for giving the indication of updating the management file, updates the management file retained in said storage unit of same node as itself in accordance with the command inputted by the operator.

4. A distributed processing system according to claim 1, wherein a plurality of said storage devices configure same shared file system.

5. A distributed processing system according to claim 1, wherein said storage device is a disk within a disk device.

6. A distributed processing system according to claim 1, wherein each of said storage devices is a partition defined by logically partitioning a storage area on a disk of disk device.

7. A distributed processing system according to claim 1, wherein each of said storage devices configuring said shared file system retains device identification information used by each of nodes sharing said shared file system accessing itself, and
    said control module for giving the indication of updating the management file updates the device identification information in each of said storage devices in accordance with the command inputted by the operator.

8. A distributed processing system according to claim 1, wherein said control module of each of said individual nodes, only if the identification information of its own node is defined within the management file stored in said storage unit of its own node, accesses said storage device of which identification information is defined in same management file.

9. A distributed processing system according to claim 1, wherein the updating of the management file is an addition of the identification information of said node to the management file.

10. A distributed processing system according to claim 1, wherein the updating of the management file is a deletion of the identification information of said node from the management file.

11. A distributed processing system according to claim 1, wherein the updating of the management file is an addition of the identification information of said storage device to the management file.

12. A distributed processing system according to claim 1, wherein the updating of the management file is a deletion of the identification information of said storage device form the management file.

13. A distributed processing system according to claim 1, wherein the updating of the management file is a change of the identification information of said node defined in the management file.

14. A distributed processing system having a plurality of nodes and at least one storage device connected to each other under a network environment, each of said nodes comprising:
    a first storage unit for retaining a management file defining identification information of a storage device configuring a shared file system and identification information of said nodes sharing said shared file system;
    a second storage unit for retaining mount information indicating whether or not said shared file system corresponding to the identification information of a storage device defined by the management file is mounted to its own node; and
    a control module for updating the definitions of the mount information,
    wherein said control module of at least one of said nodes indicates said control module of each of said nodes to update the mount information retained in each of said second storage units in accordance with a command inputted by an operator.

15. A distributed processing system according to claim 14, wherein said control module of each of said nodes indicates said control module of each of said nodes to update the mount information retained in each of said second storage units in accordance with the command inputted to its own node by the operator.

16. An apparatus for operating a shared file system in a node configuring a distributed processing system together with other nodes and at least one storage device under a network environment, comprising:
    a storage unit for retaining a management file defining identification information of a storage device configuring a shared file system, and identification information of said nodes sharing said shared file system; and a control module for indicating other nodes configuring said distributed processing system and having said storage unit, to update the management file stored in respective storage unit of each node in accordance with a command inputted by an operator.

17. An apparatus for operating a shared file system in a node configuring a distributed processing system together with other nodes and at least one storage device under a network environment comprising:

a first storage unit for retaining a management file defining identification information of a storage device configuring a shared file system, and identification information of said nodes sharing said shared file system;

a second storage unit for retaining mount information indicating whether or not the shared file system corresponding to the identification information of a storage device defined by the management file is mounted to its own node; and a control module for indicating other nodes configuring said distributed processing system and having said first and second storage units, to update the mount information retained in each of said second storage units in accordance with a command inputted by an operator.

18. A computer readable medium stored with a program for making a computer configuring a distributed processing system together with other computers and at least one storage device under a network environment execute steps of:

retaining a management file for defining identification information of a storage device configuring a shared file system and identification information of said computers sharing said shared file system; and indicating each of said other computers configuring said distributed processing system to update the management file retained by each of said computers in accordance with a command inputted by an operator.

19. A computer readable medium stored with a program for making a computer configuring a distributed processing system together with other computers and at least one storage device under a network environment execute steps of:

retaining a management file defining identification information of a storage device configuring a shared file system and identification information of said computers sharing said shared file system;

retaining mount information indicating whether or not said shared file system corresponding to the identification information of a storage device defined by the management file is mounted to its own computer; and indicating each of said other computers configuring said distributed processing system to update the mount information retained by each of said computers in accordance with a command inputted by an operator.

* * * * *